United States Patent
Kalapatapu et al.

(10) Patent No.: US 10,064,098 B2
(45) Date of Patent: Aug. 28, 2018

(54) DUAL CONNECTIVITY AND CARRIER AGGREGATION AT AN IP LAYER

(71) Applicant: Google Inc., Mountain View, CA (US)

(72) Inventors: Dutt Kalapatapu, Santa Clara, CA (US); Hassan Sipra, San Jose, CA (US); Ankur Jain, Mountain View, CA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 15/175,730

(22) Filed: Jun. 7, 2016

(65) Prior Publication Data

US 2017/0164234 A1   Jun. 8, 2017

Related U.S. Application Data

(60) Provisional application No. 62/264,060, filed on Dec. 7, 2015.

(51) Int. Cl.
| | |
|---|---|
| *H04W 28/08* | (2009.01) |
| *H04W 24/10* | (2009.01) |
| *H04W 28/02* | (2009.01) |
| *H04W 28/10* | (2009.01) |
| *H04W 76/16* | (2018.01) |
| *H04W 84/04* | (2009.01) |

(Continued)

(52) U.S. Cl.
CPC .......... *H04W 28/08* (2013.01); *H04W 24/10* (2013.01); *H04W 28/0231* (2013.01); *H04W 28/10* (2013.01); *H04W 76/16* (2018.02); *H04L 45/24* (2013.01); *H04W 84/045* (2013.01); *H04W 88/06* (2013.01)

(58) Field of Classification Search
CPC . H04W 24/10; H04W 28/0231; H04W 28/08; H04W 28/10; H04W 76/023; H04W 76/026; H04W 84/045; H04W 88/06
See application file for complete search history.

(56) References Cited

U.S. PATENT DOCUMENTS

| | | | |
|---|---|---|---|
| 2014/0269493 A1* | 9/2014 | Forenza | H04B 7/0452 370/328 |
| 2014/0269502 A1* | 9/2014 | Forenza | H04B 17/12 370/328 |

(Continued)

FOREIGN PATENT DOCUMENTS

| | | |
|---|---|---|
| EP | 2713653 A1 | 4/2014 |
| WO | WO-2015032565 A1 | 3/2015 |

OTHER PUBLICATIONS

International Search Report and Written Opinion for PCT related application No. PCT/2016/062176 dated Mar. 13, 2017.

*Primary Examiner* — Brian D Nguyen
(74) *Attorney, Agent, or Firm* — Honigman Miller Schwartz and Cohn LLP

(57) ABSTRACT

A method includes receiving one or more data packets from an external network, establishing a first data bearer when a user device connects to a first network, and establishing a second data bearer when the user device connects to a second network. The user device is configured for dual connectivity with the first network and the second network. The method also includes routing the one or more data packets through at least one of the first network or the second network to the user device to simultaneously balance network traffic load across both the first network and the second network.

30 Claims, 18 Drawing Sheets

(51) Int. Cl.
  *H04W 88/06* (2009.01)
  *H04L 12/707* (2013.01)

(56) References Cited

U.S. PATENT DOCUMENTS

| | | | |
|---|---|---|---|
| 2014/0269642 A1* | 9/2014 | Forenza | H04J 11/003 |
| | | | 370/337 |
| 2014/0342748 A1 | 11/2014 | Zou | |
| 2014/0362829 A1 | 12/2014 | Kazmi et al. | |
| 2015/0181491 A1 | 6/2015 | Van Phan et al. | |
| 2015/0244429 A1* | 8/2015 | Zhang | H04B 7/024 |
| | | | 370/329 |
| 2016/0066233 A1* | 3/2016 | Balachandran | H04W 76/026 |
| | | | 370/331 |
| 2016/0094446 A1* | 3/2016 | Kazmi | H04L 12/6418 |
| | | | 370/392 |

* cited by examiner

DUAL CONNECTIVITY AND CARRIER AGGREGATION AT AN IP LAYER

CROSS REFERENCE TO RELATED APPLICATIONS

This U.S. patent application claims priority under 35 U.S.C. § 119(e) to U.S. Provisional Application 62/264,060, filed on Dec. 7, 2015, which is hereby incorporated by reference in its entirety.

TECHNICAL FIELD

This disclosure relates to dual connectivity and carrier aggregation at an IP layer, and in particular, to dual connectivity and carrier aggregation over macro-cell networks and small-cell networks.

BACKGROUND

Wireless communication networks provide communication content such as voice, video, packet data, messaging, and broadcast. A wireless communication network may support operation on multiple carriers, each carrier including a range of frequencies used for communication and associated with system information describing operation of the carrier. A Long-Term Evolution (LTE) network provides wireless communication of high-speed data for mobile devices and data terminals. LTE networks increase the capacity and speed of existing radio access network (RAN) technologies by using a different radio interface with core network improvements. The wireless communication network may include a number of base stations that can support communication for a number of user devices. A user device (e.g., user equipment) communicates with a base station via downlink and optionally an uplink.

Wireless networks may be multiple-access networks capable of supporting multiple users by sharing available network resources. For instance, a mobile network operator may deploy a macro-cell LTE network for providing wireless content to multiple subscribers across a region, while a shopping venue may deploy a small-cell LTE network via one or more access points within its boundaries for providing Wi-Fi to its customers. The user device may be enabled for dual access to a macro-cell network as well as a small-cell network, such that two independent bearers may each be routed through one of the macro-cell network or the small-cell network to the user device. In some scenarios, a switching gateway associated with the macro-cell network routes one independent bearer to a node B of the macro-cell network and another independent bearer to a node C of the small-cell network. The existing techniques for dual access generally require the nodes of each of the macro- and small-cell networks to be controlled by the same carrier or controlled by the network operator of the macro-cell network, leaving little ability for an operator of the small-cell network to control mobility for accessing both networks.

SUMMARY

One aspect of the disclosure provides a method for dual connectivity and carrier aggregation at an IP layer. The method includes receiving, at control hardware, one or more data packets from an external network in communication with the control hardware, and establishing, by the control hardware, a first data bearer when a user device connects to a first network employing the control hardware. The method also includes establishing, by the control hardware, a second data bearer when the user device connects to a second network in communication with the control hardware, and routing the one or more data packets through at least one of the first network or the second network to the user device to simultaneously balance network traffic load across both the first network and the second network. The user device is configured for dual connectivity with the first network and the second network.

Implementations of the disclosure may include one or more of the following optional features. In some implementations, the macro-cell network includes a first long-term evolution radio access network supporting radio communication of the one or more data packets from the external network to the user device via one or more macro-cell evolved nodes. The small-cell network may include a second long-term evolution radio access network supporting radio communication of the one or more data packets from the external network to the user device via one or more small-cell evolved nodes. The macro-cell network and the small-cell network may be associated with different carriers and the user device may be a subscriber of both the macro-cell network and the small-cell network. The macro-cell network may be associated with a mobile network operator and the small-cell network may include a neutral host network for the macro-cell network. The user device may be a subscriber of the macro-cell network.

In some examples, the method includes receiving, at the control hardware, link-layer statistics from the user device. The link-layer statistics may indicate a quality of the first network and the second network during downlink communications. The routing of the one or more data packets through at least one of the first network or the second network may be based on the quality of the first network and the second network during the downlink communications. The user device may include: a first interface providing first control plane layers configured to interface with the first network; a second interface providing second control plane layers configured to interface with the second network; and an application layer configured to collect and provide the link-layer statistics to the control hardware.

In some implementations, the routing of the one or more data packets includes executing a flow aware aggregation procedure that simultaneously distributes a first flow of data to the user device through the first network and a separate second flow of data to the user device through the second network. The first flow of data and the second flow of data may be equally balanced between the first network and the second network when the first flow of data and the second flow of data are carrying a substantially equal amount of data. When the first network includes a small-cell network and the second network comprises a macro-cell network, the method may include executing, by the control hardware, a flow agnostic aggregation procedure that simultaneously splits at least one flow of data for routing to the user device between the first network and the second network.

In some examples, when the first network comprises a macro-cell network and the second network comprises a small-cell network, the method includes determining, by the control hardware, the first data bearer and the second data bearer each include a same access point name, and wherein routing the one or more data packets includes routing the first data bearer and the second data bearer to the user device through both the first network and the second network. The second network may include a serving gateway associated with a terrestrial wide area network configured to associate the second network as a trusted non-3$^{rd}$ Generation Partnership Project access for a shared spectrum having a different radio access technology than a radio access technology of the first network. The first bearer may be associated with Internet data and the second bearer may be associated with Internet Protocol Multimedia Subsystem data.

The method may also include receiving, at the control hardware, an uplink data packet from the user device through one of the first network or the second network, and transmitting the received uplink data packet to the external network. The user device may receive modem measurement reports from each of the first network and the second network and uses the modem measurement reports to steer uplink traffic by routing the uplink data packet through the one of the first network or the second network. Each modem measurement report may indicate traffic and/or available bandwidth over the respective one of the first network or the second network.

Another aspect of the disclosure provides a system configured for wireless communication. The system includes: a first network in communication with an external network and including a packet network gateway, a first serving gateway, and a first communication node; a second network in communication with the external network and including a second serving gateway and a second communication node; and a user device configured for dual connectivity to the first network and the second network. The user device communicates with the external network through at least one of the first network or the second network. The packet data network gateway of the first network is shared by both the first network and the second network. The packet data network includes control hardware configured to: receive one or more data packets from the external network; establish a first data bearer when the user device connects to the first network; establish a second data bearer when the user device connects to a the second network; and route the one or more data packets through at least one of the first network or the second network to the user device to simultaneously balance network traffic load across both the first network and the second network.

This aspect may include one or more of the following optional features. The first network may include one of a small-cell network or a macro-cell network and the second network may include the other one of the small-cell network or the macro-cell network. The macro-cell network may include a first long-term evolution radio access network supporting radio communication of the one or more data packets from the external network to the user device via one or more macro-cell evolved nodes. The small-cell network may include a second long-term evolution radio access network supporting radio communication of the one or more data packets from the external network to the user device via one or more small-cell evolved nodes. The macro-cell network and the small-cell network may be associated with different carriers and the user device may be a subscriber of both the macro-cell network and the small-cell network. The macro-cell network may be associated with a mobile network operator and the small-cell network may include a neutral host network for the macro-cell network, and wherein the user device may be a subscriber of the macro-cell network.

In some examples, the control hardware is further configured to receive link-layer statistics from the user device. The link-layer statistics may indicate a quality of the first network and the second network during downlink communications. The control hardware may route the one or more data packets through at least one of the first network or the second network based on the quality of the first network and the second network during the downlink communications. The user device may include: a first interface providing first control plane layers configured to interface with the first network; a second interface providing second control plane layers configured to interface with the second network; and an application layer configured to collect and provide the link-layer statistics to the control hardware. The control hardware may be further configured to route the one or more data packets by executing a flow aware aggregation procedure that simultaneously distributes a first flow of data to the user device through the first network and a separate second flow of data to the user device through the second network. The first flow of data and the second flow of data may be equally balanced between the first network and the second network when the first flow of data and the second flow of data are carrying a substantially equal amount of data.

In some examples, the first network includes a small-cell network and the second network includes a macro-cell network. The control hardware may be further configured to route the one or more data packets by executing a flow agnostic aggregation procedure that simultaneously splits at least one flow of data for routing to the user device between the first network and the second network. The first network may include a macro-cell network and the second network may include a small-cell network. The control hardware may be further configured to determine the first data bearer and the second data bearer each comprise a same access point name, and route the first data bearer and the second data bearer to the user device through both the first network and the second network. The second serving gateway of the second network may be associated with a terrestrial wide area network configured to associate the second network as a trusted non-$3^{rd}$ Generation Partnership Project access for a shared spectrum having a different radio access technology than a radio access technology of the first network. The first bearer may be associated with Internet data and the second bearer may be associated with Internet Protocol Multimedia Subsystem data.

In some implementations, the control hardware is further configured to receive an uplink data packet from the user device through one of the first network or the second network, and transmit the received uplink data packet to the external network. The user device may also be configured to receive a first modem measurement report from the first communication node of the first network, receive a second modem measurement report from the second communication node of the second network, and steer uplink traffic by routing the uplink data packet through the one of the first network or the second network based on the received first and second modem measurement reports. The first modem measurement report may indicate traffic and/or available bandwidth over the first network. The second modem measurement report may indicate traffic and/or available bandwidth over the second network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
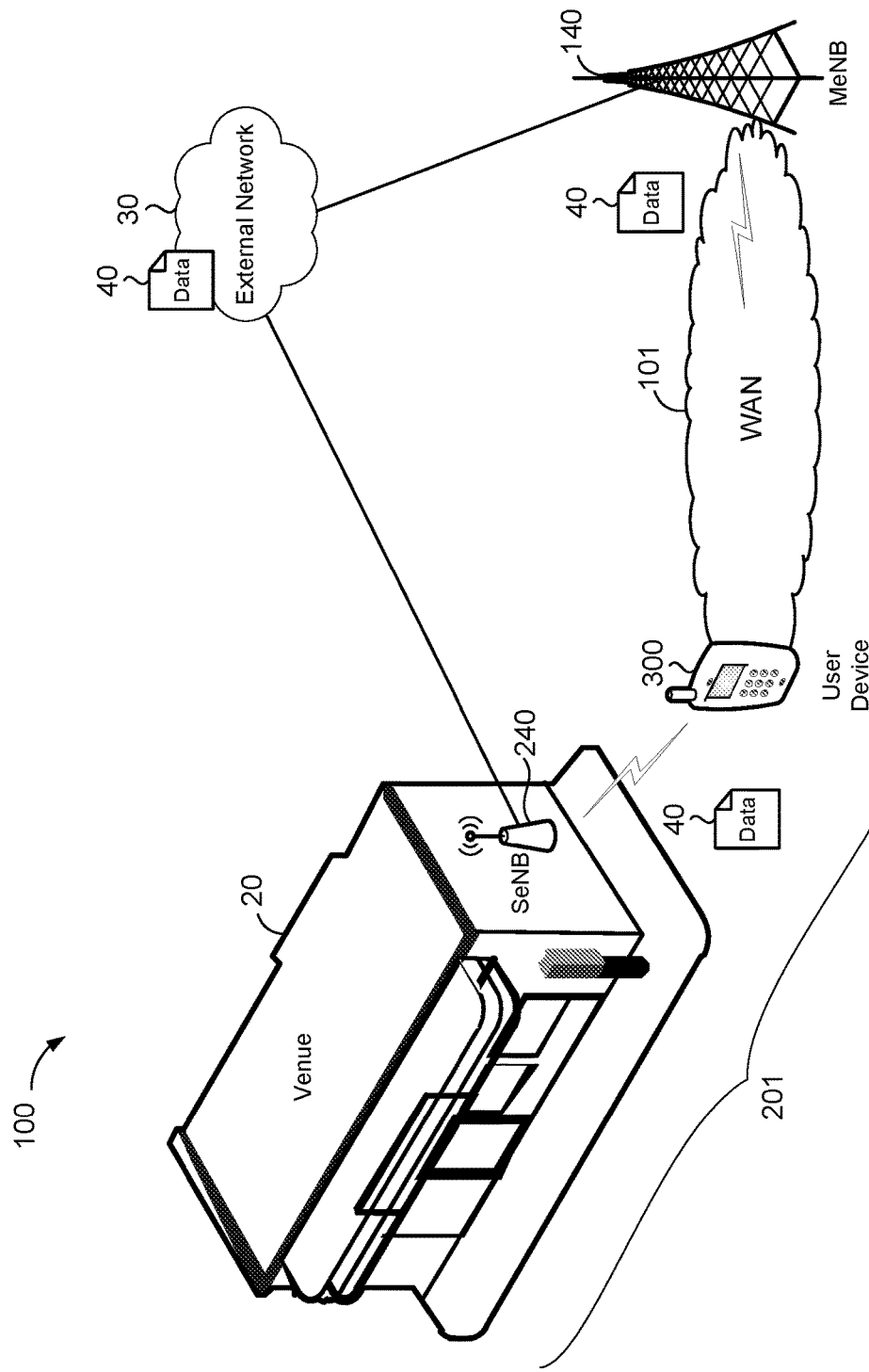
FIG. 1 is a schematic view of an example wireless network for providing a user device dual access to a macro-cell network and a small-cell network.

Referring to FIG. 1, in some implementations, a wireless communication environment 100 includes a user device 300 in communication with an external network 30 through a macro-cell network 101 and/or a small-cell network 201. In some examples, the macro-cell network 101 and the small-cell network 201 are managed by different carriers. The external network 30 may include a packet data network (PDN), which may be the Internet. The macro-cell network 101 may include a Long-Term Evolution (LTE) radio access network (RAN) that supports radio communication of data packets 40 and/or other services from the external network 30 to the user device 300 via one or more macro-cell evolved Node B's (MeNB) 140. In some examples, the macro-cell network 101 is associated with a mobile network operator (MNO) that provides services of wireless communications to a subscribing user device 300 via the network 101. Accordingly, the terms macro-cell network 101 and MNO core may be used interchangeably herein. The small-cell network 201 may include an LTE RAN that supports radio communication of data packets 40 and/or other services from the external network 30 to the user device 300 via one or more small-cell evolved Node B's (SeNB) 240. For instance, a user device 300 subscribing to the small-cell network 201 may be at, or near a venue 20 employing the SeNB 240 to connect the user device 300 to the small-cell network 201.

Each eNB 140, 240 includes a device that communicates with the user device 300 using analogue and digital signal processing functions of an LTE air interface. Each eNB 140, 240 may also be referred to as a base station or an access point for providing communication coverage for a particular geographic area and supporting radio communication for the user device 300 located within the coverage area. Here, the SeNB 240 associated with the small-cell network 201 provides a smaller coverage area than the macro-cell network 101 serviced by the MeNB 140. In some configurations, the small-cell network 201 employs a PDN gateway (PGW) 210 (FIG. 2A) shared by both networks 101, 201 to simultaneously balance network traffic load across both of the networks 101, 201. In these configurations, the PGW 210 of the small-cell network 201 aggregates the network traffic among the macro-cell network 101 and the small-cell network 201. In other configurations, the macro-cell network 101 employs a PGW 110 (FIGS. 4A and 6A) shared by both networks 101, 201 to actively switch network traffic between the macro-cell network 101 and the small-cell network 201. In these configurations, an operator of the small-cell network 201 provides components that interface with the PGW 110 run by the MNO of the macro-cell network 101.

The user device 300 communicates with one or both of the eNB's 140, 240 at any given movement for radio communication. The user device 300 may be stationary or mobile and may be referred to as user equipment, a mobile station, a terminal, an access terminal, a subscriber unit, or a station. The user device 300 may include a cellular phone, a smartphone, a tablet, a wireless communication device, a personal digital assistant (PDA), a wireless modem, a handheld device, a laptop computer, or other mobile computing device.

Figure 2A:
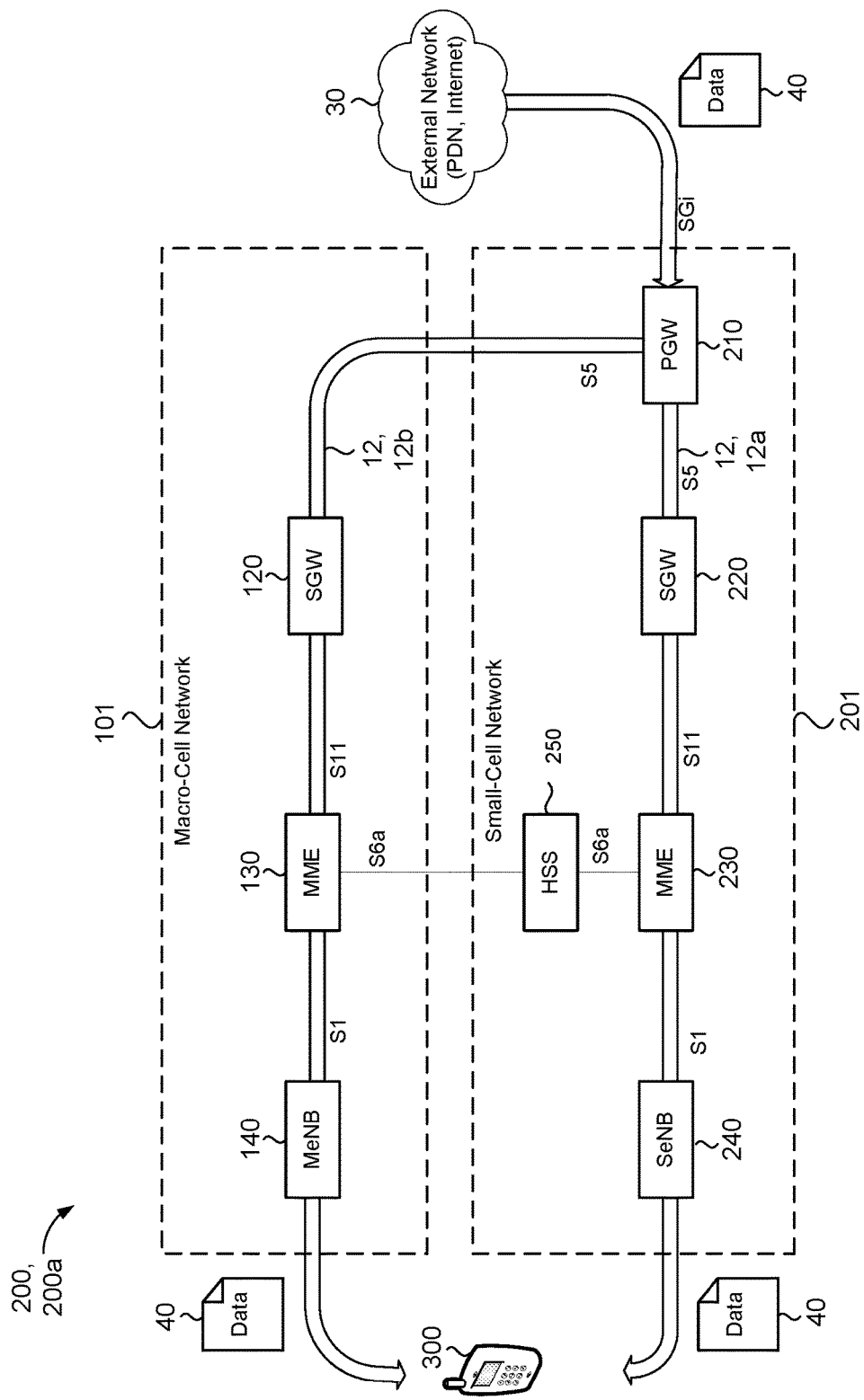
FIG. 2A is a schematic view of a small-cell network providing a packet data network gateway for directing the flow of data through the small-cell network and/or a macro-cell network to a user device.

Referring to FIG. 2A, in some implementations, a schematic view 200, 200a shows a system including the small-cell network 201 employing the PGW 210 shared by both the macro-cell network 101 and the small-cell network 201. The macro-cell network 101 includes a serving gateway (SGW) 120, a Mobility Management Entity (MME) 130, and the MeNB 140. The small-cell network 201 includes the PGW 210, an SGW 220, an MME 230, a Home Subscriber Server (HSS) 250, and the SeNB 240.

Each SGW 120, 220 performs various functions related to IP data transfer for user devices 300 such as data routing and forwarding, as well as mobility anchoring. The SGWs may perform functions such as buffering, routing, and forwarding of data packets 40 for user devices 300. Each MME 130, 230 performs various functions such as, but not limited to, control of signaling and security for a Non Access Stratum (NAS), authentication and mobility management of user devices 300, selection of gateways for user devices 300, and bearer management functions. The HSS 250 may store subscription-related information (e.g., user profiles) and location information for user devices 300, perform authentication and authorization of users, and provide information about user location and routing information when requested.

The PGW 210 (and the PGW 110 of FIGS. 4A-4C and 6A-6C) performs various functions such as, but not limited to, maintenance of data connectivity for user devices 300, internet protocol (IP) address allocation, packet filtering for user devices 300, service level gating control and rate enforcement, dynamic host configuration protocol (DHCP) functions for clients and servers, and gateway general packet radio service (GGSN) functionality. The PGW 210 also terminates at an SGi interface toward the external network 30 (e.g., PDN). The SGi is a reference point between the PGW 210 and the PDN 30 for provisioning of data services. The PGW 110, 210 includes control hardware for performing the aforementioned functions.

FIG. 2A shows the small-cell network 201 running the PGW 210 shared by both the macro-cell network 101 and the small-cell network 201 to simultaneously balance network traffic load across both of the networks 101, 201. In some examples, the user device 300 is a subscriber to both the small-cell network 201 and the macro-cell network 101, whereby the networks 101, 201 are associated with different carriers. The user device 300 may be configured for dual connectivity to each of the networks 101, 201 and may use the macro-cell network 101 for access aggregation or for lack of coverage by the small-cell network 201. The PGW 210 is configured to route data packets 40 received from the PDN 30 through each of the networks 101, 201 via data bearers 12, 12a-b. A bearer 12 refers to an information transmission path of defined characteristics, e.g., capacity, delay, bit error rate, etc. A data bearer 12 is a bearer for exchanging data packets 40 between the PGW 210 and the user device 300. The data bearers 12a, 12b may refer to Evolved Packet System EPS bearers for the macro-cell and micro-cell LTE networks 101, 201, respectively. In some examples, one or more data bearers 12a accessing the small-cell network 101 establish when the user device 300 connects to the small-cell network 201 via the SeNB 240, and one or more data bearers 12b accessing the macro-cell network 101 establish when the user device 300 connects to the macro-cell network 101 via the MeNB 140. The data bearers 12 may provide traffic flow templates (TFTs) used to filter data packets 40 sent via the associated data bearer 12, quality-of-service (QoS) parameters for data transfer between the user device 300 and the PGW 210, packet forwarding treatment related to scheduling policy, queue management policy, rate shaping policy, Radio Link Control (RLC) configuration, and/or other characteristics. In some examples, the user device 300 is configured with one data bearer 12a through the small-cell network 201 for receiving data packets 40 related to downloads from the Internet 30 and another data bearer 12b through the macro-cell network 101 for receiving data packets 40 related to Voice-over-IP (VoIP) communications.

The MeNB 140 and the SeNB 240 are managed by respective ones of the MME's 130, 230. Moreover, the MeNB 140 and the SeNB 240 include two different tracking areas, such that bearers 12a, 12b from the MENB 140 and the SeNB 240 map to respective ones of the SGW's 120, 220.

Figure 2B:
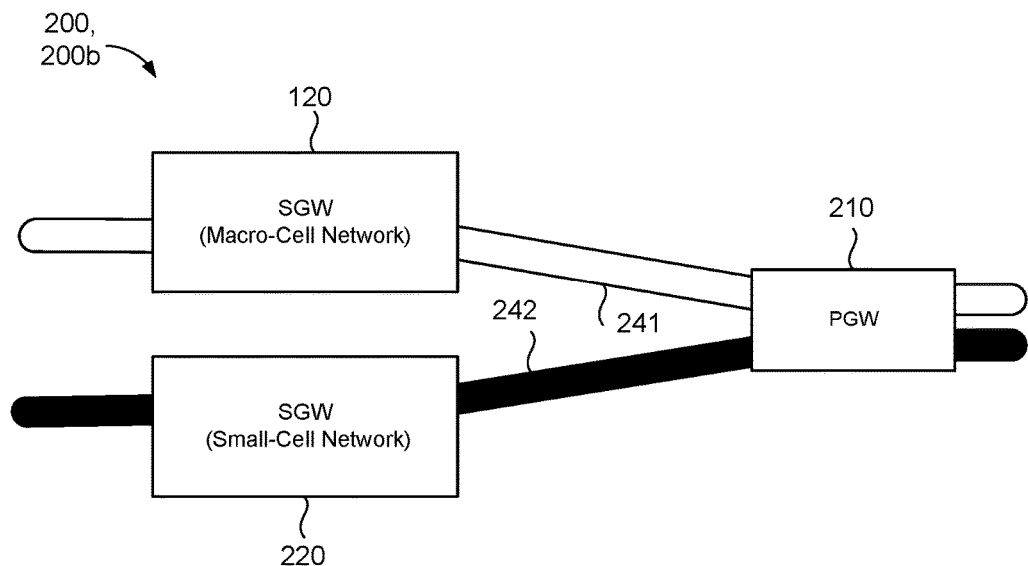
FIG. 2B is a schematic view of an example flow aware aggregation procedure facilitated between a macro-cell network and a small-cell network connected to a user device.

Referring to FIG. 2B, in some implementations, a schematic view 200b shows the PGW 210 at the small-cell network 201 executing a flow aware aggregation procedure distributing different flows of data packets 40 across respective ones of the networks 101, 201. That is, during the flow aware aggregation procedure, the PGW 210 distributes a single flow of a data packet 40 to only traverse one of the networks 101, 201 while distributing a different data packet 40 flow to only traverse the other network 101, 201. FIG. 2B shows the PGW 210 simultaneously distributing a first data packet flow 241 along the bearer 12b that only traverses the macro-cell network 101 and a second data packet flow 242 along the bearer 12a that only traverses the small-cell network 201. Here, the flow aware aggregation procedure facilitated by the PGW 210 balances network traffic between each of the networks 101, 201 when each of the flows 241, 242 are carrying equal amounts of traffic (e.g., data packets 40). When one of the bearers 12a or 12b is carrying more data 40 than the other, such as when directing a data packet 40 related to streaming video, then traffic flow will be heavier through the network 101, 201 that is carrying more data.

Figure 2C:
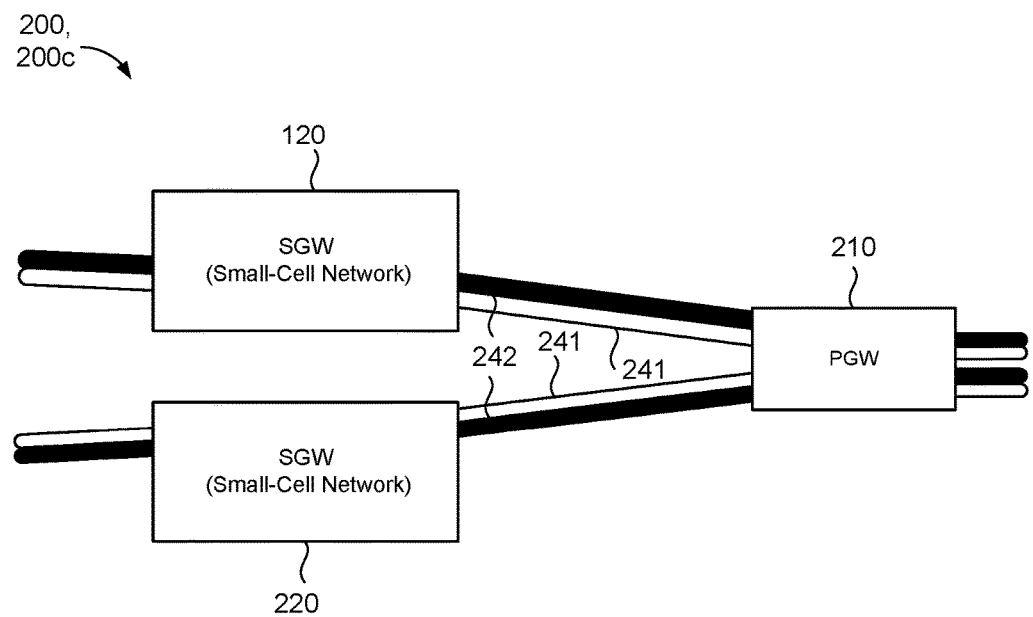
FIG. 2C is a schematic view of an example flow agnostic aggregation procedure facilitated between a macro-cell network and a small-cell network connected to a user device.

Referring to FIG. 2C, in some implementations, a schematic view 200c shows the PGW 210 at the small-cell network 201 and the user device 300 executing a flow agnostic aggregation procedure by splitting a given flow of a data packet 40 between more than one of the networks 101, 201. The distribution of data packets 40 (e.g., downlink and/or uplink) through splitting can be based upon RAN conditions, network capacity, link capacity and other metrics. FIG. 2C shows the PGW 210 splitting the first data packet flow 241 and the second data packet flow 242 along each of the bearers 12a, 12b. Here, the flow agnostic aggregation procedure achieves a uniform distribution of traffic across the macro-cell network 101 and the small-cell network 201 while utilizing a maximum link capacity associated with each of the bearers 12a, 12b. Each data packet flow 241, 242 of FIGS. 2B and 2C may be defined by 5 tuple and include a source IP, a destination IP, IP protocol, a source port, and a destination port.

Accordingly, the network configuration employing the PGW 210 at the small-cell network 201 of FIG. 2A provides seamless mobility and enables both the flow aware aggregation procedure and the flow agnostic aggregation procedure to facilitate without making any changes to the macro-cell network 101, including changes to the MeNB 140, managed by the MNO. The user device 300, however, may require configuration changes to perform network selection and traffic steering across the networks 101, 201. Moreover, the PGW 210 at the small-cell network 201 may require a carrier aggregation model across both networks 101, 201 to be enabled. In some scenarios, the user device 300 requires a carrier aggregation model across both networks 101, 201 to be enabled for a subscription owned by the small-cell network 201. Additionally or alternatively, when the small-cell network 201 is associated with a neutral host network for subscribing to the macro-cell network 101, the user device 300 may require enabling a carrier aggregation model across both networks 101, 201. By contrast, options outlined by the 3$^{rd}$ Generation Partnership Project (3GPP) for dual connectivity to a macro-cell network 101 and a small-cell network 201 either require (1) both networks 101, 201 to be controlled by the same carrier where a single SGW 120 at the macro-cell network 101 hands off one of the bearers 12 to the SeNB 240, or (2) uses the MeNB 140 to split one of the bearers 12 and hand the split bearer 12 off directly to the SeNB 240. Thus, in the second option, the MeNB 140 at the macro-cell network 101 controls access to the small-cell network 201

Figure 3A:
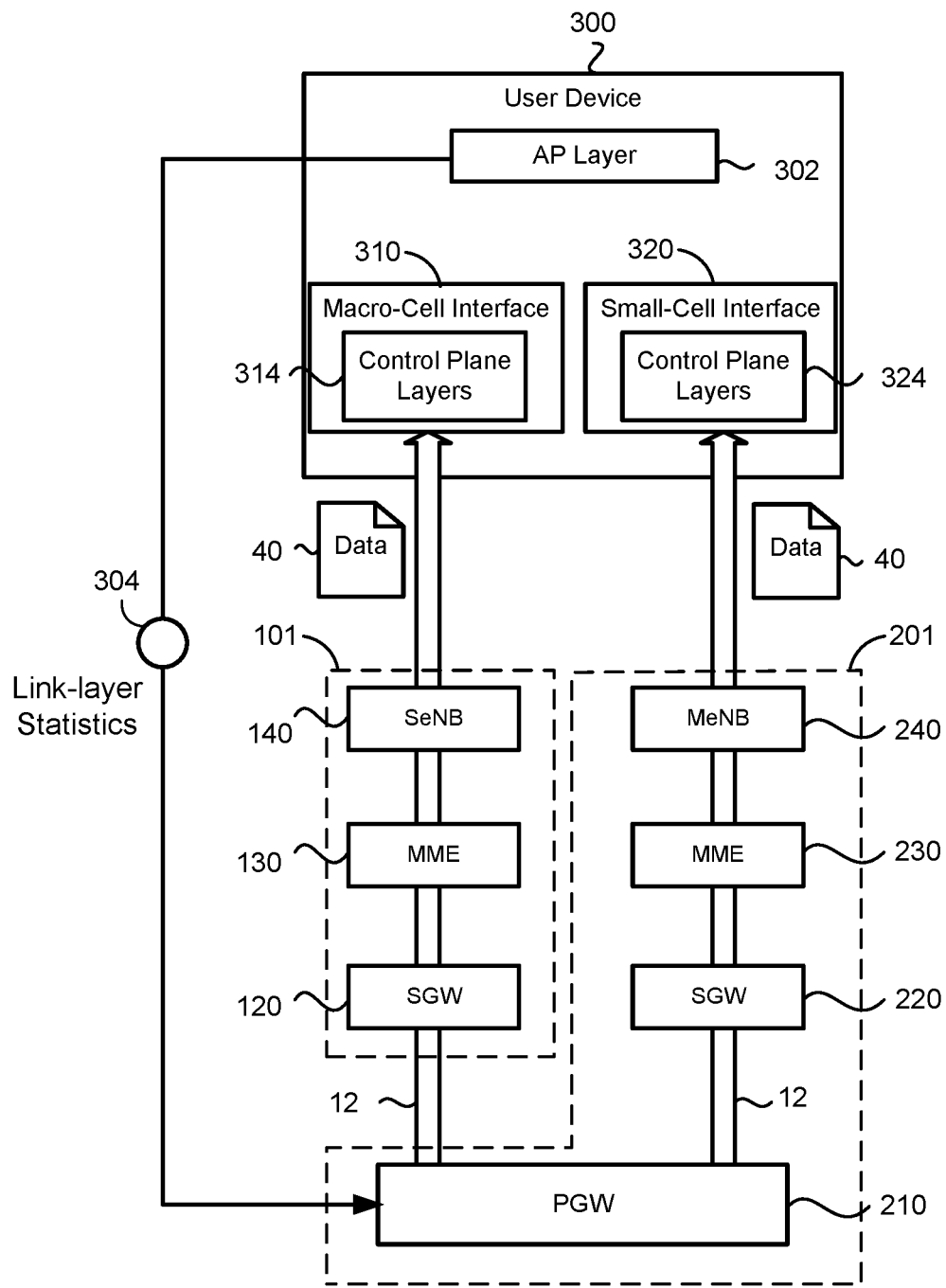
FIG. 3A is a schematic view of an example user device receiving downlink communications from a macro-cell network and a small-cell network.
Figure 3B:
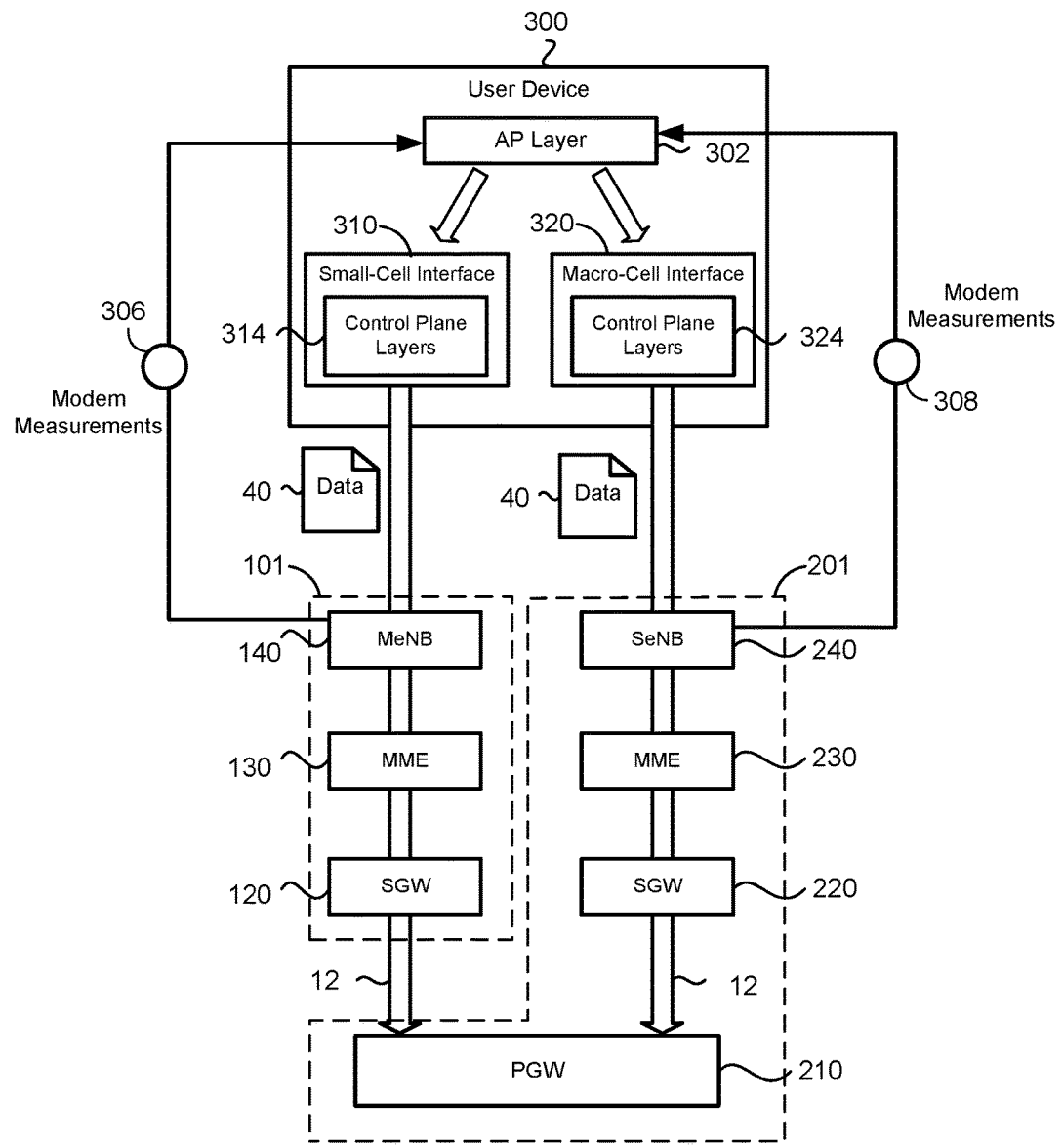
FIG. 3B is a schematic view of a macro-cell network and a small-cell network receiving uplink communications from a user device.

FIGS. 3A and 3B show an example user device 300 in communication with the macro-cell network 101 and the small-cell network 201 employing the PGW 210 shared by both of the networks 101, 202. By using the small-cell network 201 to employ the shared PGW 210, the user device 300 is configured to receive data packets 40 through the networks 101, 201 from the PGW 210 executing either one of the flow aware aggregation procedure (FIG. 2B) or the flow agnostic aggregation procedure (FIG. 2C).

The user device 300 includes data processing hardware and employs one or more antennas for communicating with each of the networks 101, 201 via a user plane and a control plane. A user plane carries data for higher-layer applications and employs a user-plane bearer, which is typically implemented with standard protocols such as User Datagram Protocol (UDP), Transmission Control Protocol (TCP), and Internet Protocol (IP). Accordingly, the user device 300 includes an application IP layer (AP layer) 302 associated with the user plane. The control plane carries data (e.g., signaling) and is typically implemented with network-specific protocols, interfaces, and signaling messages such as NAS messages and Radio Resource Control (RRC) messages. For instance, data packet 40 traffic between the user device 300 and each of the networks 101, 201 may be sent via the control plane. The user device 300 provides a macro-cell interface 310 that provides control plane layers 314 configured to interface with the macro-cell network 101 and a small-cell interface 320 that provides control plane layers 324 configured to interface with the small-cell network 201. Each of the interfaces 310, 320 may be RAN interfaces including the same IP address. In some examples, the control plane layers 314, 324 include a Packet Data Convergence Protocol (PDCP) layer, an RLC configuration layer, and a physical (PHY) layer.

Referring to FIG. 3A, the user device 300 communicates with the networks 101, 201 via downlink communications. A downlink refers to the communication link from the eNB 140, 240 to the user device 300. The PGW 210 at the small-cell network 201 manages balancing of the downlink data packet flow 40 through each of the macro-cell network 101 and the small-cell network 201 based on real-time conditions of the networks 101, 201. In some examples, the PGW 210 determines the quality of the networks 101, 201 by periodically receiving link-layer statistics 304 collected by the AP layer 302 of the user device 300 that indicate a quality of the networks 101, 201. The link-layer statistics 304 may indicate received signal strength/received power, received signal quality, path loss, geometry, etc. The real-time conditions used by the PGW 210 to determine network quality may also include retrieving a cost per byte of the data packets 40 from charging and policy servers, local monitoring of data packets 40 (e.g., inter-packet jitter, TCP analysis of packet losses, etc.) flowing through the PGW 210, and/or other heuristics and statistical measurements of aggregate application performance (e.g., dropped calls, excessive latency in voice latency, video rebuffering, etc.). Accordingly, the PGW 210 determines the network quality on one or more real-time conditions to dynamically decide whether to route a given data packet 40 on each network 101, 201 for downlink communications to the user device 300.

Referring to FIG. 3B, the user device 300 optionally communicates with the networks 101, 201 via uplink communications. An uplink refers to the communication link from the user device 300 to the MeNB 140 and/or the SeNB 240. Accordingly, the user device 300 must support transmit TX radio chains to perform uplink communications. The AP layer 302 may perform data packet 40 filtering for uplink communications. The AP layer 302 performs traffic steering for uplink routing of data packets 40 through either the macro-cell interface 310 or the small-cell interface 320. In some examples, the AP layer 302 receives a modem measurement report 306 from the MeNB 140 that indicates information related to traffic and/or available bandwidth over the macro-cell network 101. Additionally or alternatively, the AP layer 302 receives a modem measurement report 308 from the SeNB 240 that indicates information related to traffic and/or available bandwidth over the small-cell network 201. The AP layer 302 may use the received modem measurement reports 306, 308 in intelligent switching algorithms to steer uplink traffic by routing the data packet 40 through one of the macro-cell interface 310 or the small-cell interface 320. When the AP layer 302 routes the data packet 40 through the macro-cell interface 310, the associated control layers 314 transmit the data packet 40 to the macro-cell network 101 via the MeNB 140, whereby the data packet 40 flows along the associated bearer 12 to the MME 130 and to the SGW 120 for handing off the data packet 40 to the PGW 210 at the small-cell network 201. When the AP layer 302 routes the data packet 40 through the small-cell interface 320, the associated control layers 324 transmit the data packet 40 to the small-cell network 202 via the SeNB 240, whereby the data packet 40 flows along the associated bearer 12 to the MME 230, the SGW 220, and the PGW 210.

In some scenarios, the user device 300 is a subscriber of the macro-cell network 101 operated by the MNO and attaches to the macro-cell network 101 and the small-cell network 201, whereby the small-cell network 201 includes a neutral host network for the macro-cell network 101. When the PGW 110 (FIGS. 4A and 6A) is employed at the macro-cell network 101 and shared by both the macro-cell and small-cell networks 101, 201, however, two bearers 12a, 12b associated with the same Access Point Name (APN) cannot be distributed toward two different SGW's 120, 220 for a given Radio Access Technology (RAT). For instance, on a shared spectrum of Evolved Universal Mobile Telecommunication System (UMTS) Terrestrial Radio Access (EUTRA) RAT and a macro-cell providing the same EUTRA RAT, multiple bearers cannot be routed on different SGW's 120, 220 without modifying the PGW 110 at the macro-cell network 101.

Figure 4A:
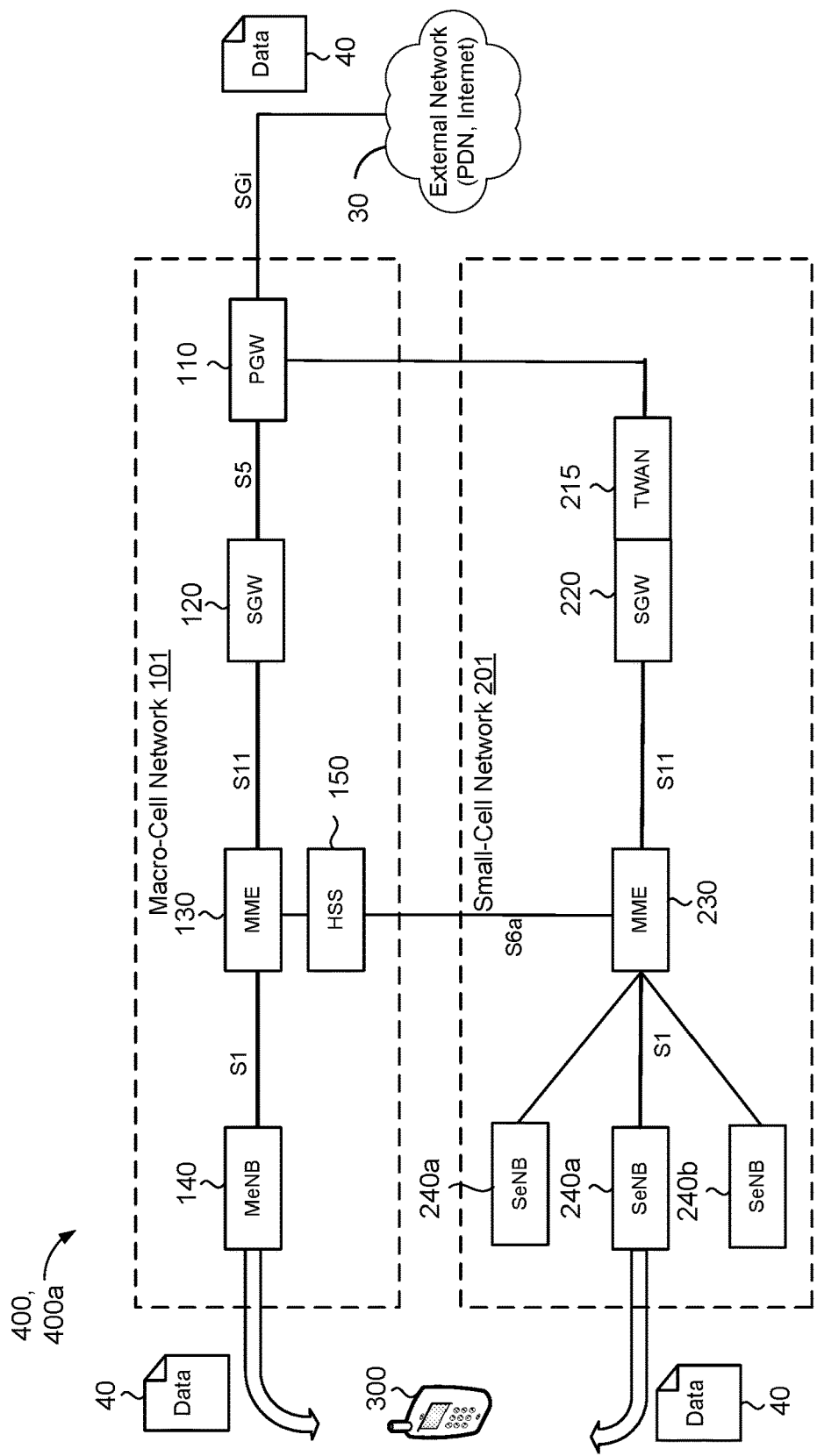
FIG. 4A is a schematic view of an example macro-cell network providing a packet data network gateway for directing the flow of data through a macro-cell network and/or a small-cell network to a user device.

Referring to FIG. 4A, in some implementations, a schematic view 400, 400a shows a shared spectrum between the small-cell network 201 and the macro-cell network 101 that includes a different RAT than the macro-cell network 101 in order to allow for the PGW 110 at the macro-cell network 101 to route multiple bearers 12 to the two different SWG's 120, 220 without modifying the PGW 110 at the macro-cell network 101. In some examples, a 3.5 GHz shared spectrum is used as the different RAT.

FIG. 4A shows the macro-cell network 101 employing the PGW 110 shared by both the macro-cell network 101 and the small-cell network 201. The macro-cell network 101 includes the PGW 110, the SWG 120, the MME 130, an HSS 150, and the MeNB 140 in communication with the user device 300. The small-cell network 201 includes the SWG 220 associated with a Terrestrial Wide Area Network (TWAN) 215, the MME 230, and one or more SeNB's 240, 240a-c in communication with the user device 300. The SWG 220 employed by the small-cell network 201 provides an S11 interface towards the MME 230 and communicates with the PGW 110 at the macro-cell network 101 via an S2A interface over a General Radio Packet Radio Service Tunneling Protocol (GTPU). The TWAN 215 enables the small-cell network 201 to be treated as a Trusted non 3GPP access for the shared spectrum of different RAT than that of the macro-cell network 101, thereby allowing the PGW 110 at the macro-cell network 101 to route multiple bearers 12 for the same APN across both the macro-cell network 101 and the small-cell network 201. In some examples, the PGW 110 provides the same IP address to both PDN connections at the external network 30 representative of each of the bearers 12a, 12b.

Figure 4B:
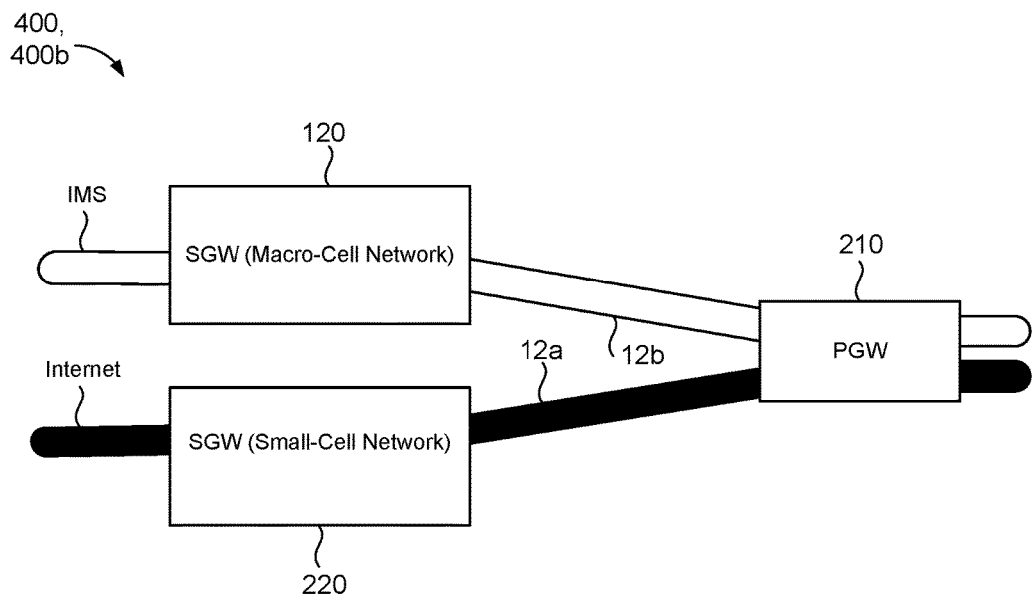
FIG. 4B is a schematic view an example packet data network gateway routing two independent bearers to different ones of a macro-cell network or a small-cell network.
Figure 4C:
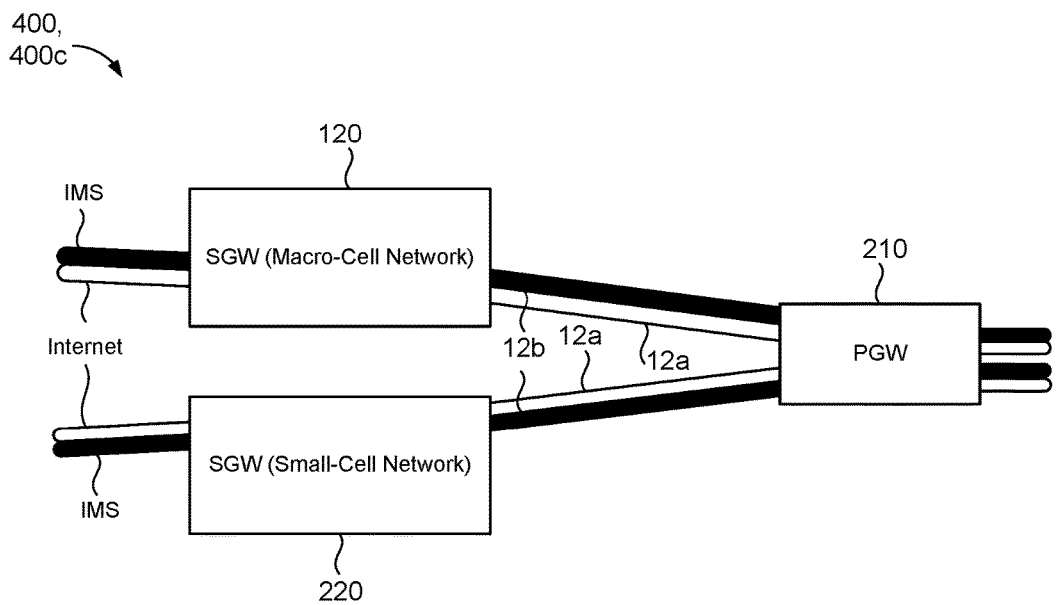
FIG. 4C is a schematic view of an example packet data network gateway splitting two independent bearers for routing to each of a macro-cell network and a small-cell network.

Referring to FIG. 4B, a schematic view 400b shows the PGW 110 simultaneously routing a first bearer 12a associated with Internet data through the small-cell network 201 via the SGW 220 and the TWAN 215, and a second bearer 12b associated with IP Multimedia Subsystem (IMS) data through the macro-cell network 101 via the SGW 120. Referring to FIG. 4C, a schematic view 400c shows the PGW 110 splitting the separate first and second bearers 12a, 12b between the macro-cell network 101 and the small-cell network 201. For instance, the PGW 110 routes a split between the first and second bearers 12a, 12b associated with respective ones of the Internet data and the IMS data through the macro-cell network 101 via the SGW 120. Similarly, the PGW 110 routes a split between the first and second bearers 12a, 12b through the small-cell network 201 via the SGW 220 and the TWAN 215.

Accordingly, the network configuration employing the PGW 110 at the macro-cell network 101 of FIG. 4A provides seamless mobility and enables the flow aware aggregation procedure (FIG. 2B) to execute without making any changes to the macro-cell network 101, including changes to the MeNB 140, managed by the MNO. Conversely to the network configuration of FIG. 2A that employs the shared PGW 210 at the small-cell network 201, the network configuration employing the PGW 110 at the macro-cell network 101 of FIG. 4A does not enable execution of the flow agnostic aggregation procedure (FIG. 2C).

Figure 5:
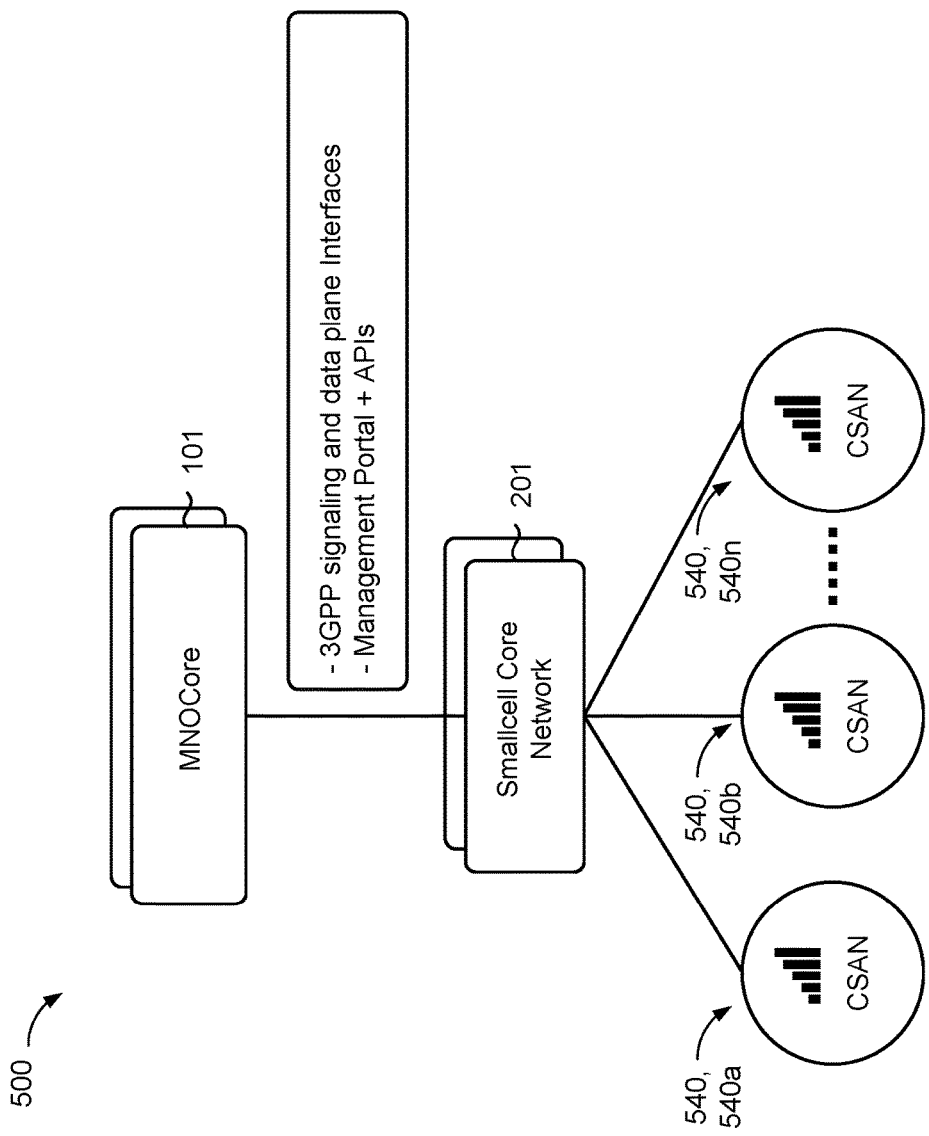
FIG. 5 is a schematic view of an example mobile network operator core network in communication with a small cell core network providing one or more Citizens Broadband Radio Service Shared Access Networks.

In some implementations, the macro-cell network 101 and the small-cell network 201 cooperate to provide access to the Citizens Broadband Radio Service (CBRS) spectrum. The CBRS includes a 150 MHz spectrum within the 3550-3700 MHz band for commercial use. Using the CBRS spectrum, private enterprises, venues, and fixed operators, for example, may deploy high-quality in-building LTE networks to which all mobile network subscribers of a MNO can roam. As such, the MNOs can benefit from an expanded footprint and capacity within the CBRS spectrum while their subscribers attain a consistent wireless broadband experience, particularly in places like indoor locations and corporate campuses. FIG. 5 is a schematic view 500 of example macro-cell networks 101 (e.g., MNO Core) each associated with a MNO in communication with a small-cell network 201 to provide multiple self-sustaining CBRS shared access networks (CSANs) 540, 540a-n. The MNO core 101 integrates with the small-cell network 201 to enable operator control and visibility into network performance and user experience of the subscribing user devices 300 of the CSANs 540. For instance, the MNO core 101 and the small-cell network 201 may use 3GPP signaling and data plane interfaces, as well and management portals in combination with Application Programming Interfaces (APIs), to allow direct service parity between the CSANs 540 and the MNO core 101 and make access and transitioning to/from CSANs 540 non-perceptible to the end-user corresponding to the user device 300. The APIs may pass through CSAN-MNO charging policies.

Moreover, the integration between the MNO core 101 and the CSANs 540 provide independent scaling of the CSANs 540 and the MNO core 101 and dynamic control of offload eligibility on CSANs 540. For instance, a CSAN 540 may decouple for onboarding, interoperability, and integration from the MNO core 101, while the MNO core 101 may similarly decouple form a large set of CSANs 540. Here, the small-cell network 201 aggregates and federates multiple CSANs 540 into a uniform service domain for the MNOs and drives commoditization of small cells by insulating the MNO core 101 from interoperability and certification testing.

Figure 6A:
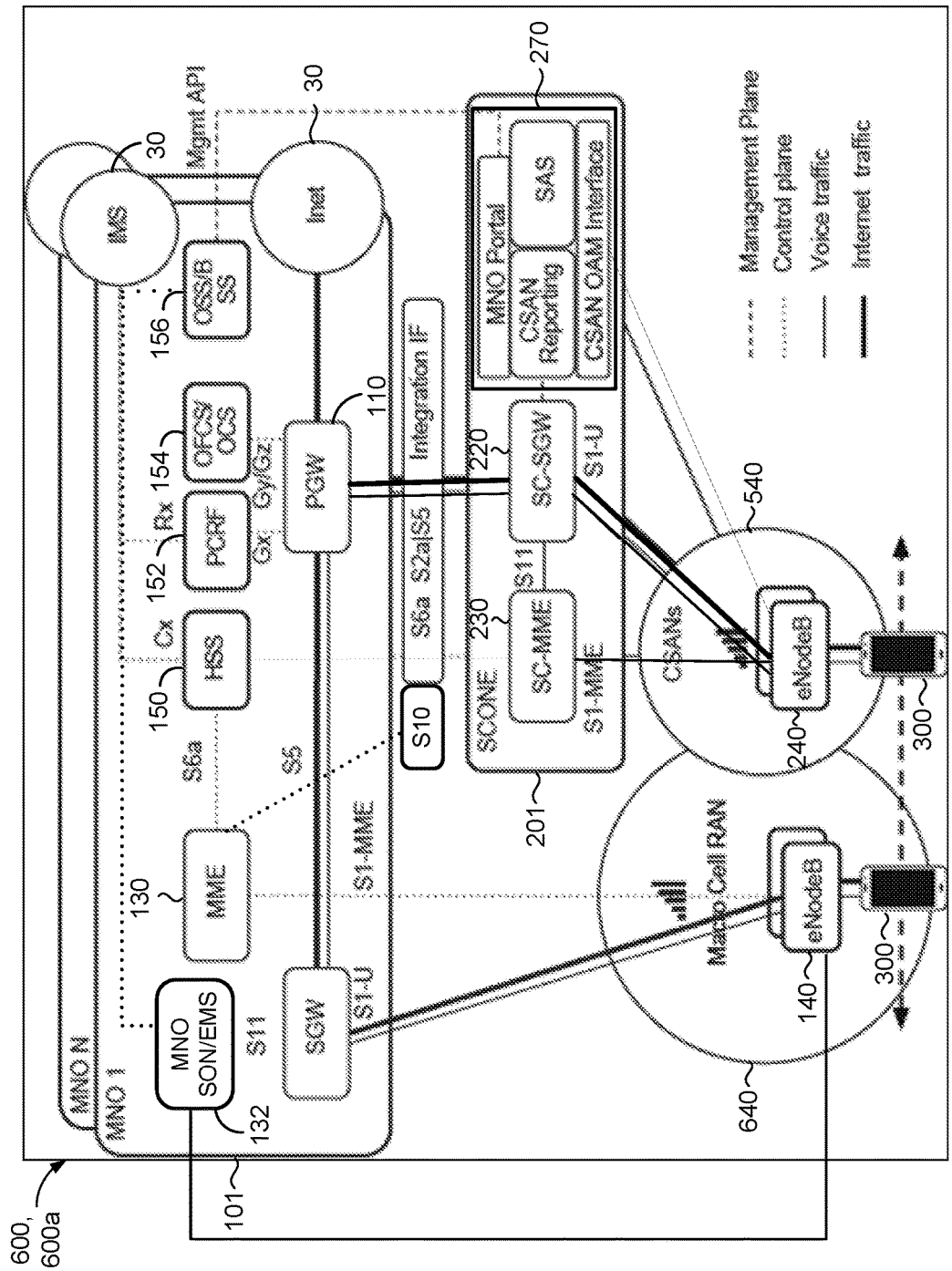
FIG. 6A is a schematic view of an example macro-cell network providing a packet data network gateway for directing the flow of data through a macro-cell network and/or a small-cell network to a user device.

Referring to FIG. 6A in some implementations, a schematic view 600, 600a shows a small-cell core network (SCONE) 201 interfacing with a corresponding MNO core network 101 (e.g., MNO 1) using standard roaming-like interfaces. The MNO core 101 may provide subscribing user devices 300 a macro-cell radio access network 640 via one or more MeNBs 140 and the SCONE 201 may provide the subscribing user devices 300 one or more CSANs 540 via one or more SeNBs 240. In some examples, the CSANs 560 include a standard LTE RAT while no RAN integration is provided through independent mobility management on the macro-cell radio access network 640 and the CSANs 540. In some examples, the user devices 300 are dual-context user devices that enable handovers between the macro-cell radio access network 640 and the CSANs 540.

In some implementations, the SCONE 201 includes a communication terminal 270 for providing management plane interfaces between the SCONE 201 and corresponding ones of the MNO core 101 and the one or more CSANs 540. For example, the communication terminal 270 at the SCONE 201 may include an MNO portal that communicates with an Operations Support Systems/Business Support Systems (OSS/BSS) module 156 at the MNO core 101 via a management plane interface API. Likewise, the SCONE 201 may include a CSAN Operation, Administration, and Maintenance (OAM) Interface module that communicates with the one or more SeNB 240s providing the CSANs 540 for the subscribing user devices 300.

The PGW 110 at the MNO core 101 routes multiple bearers to the two different SWGs 120, 220 without modifying the PGW at the MNO core 101. The PGW 110 may route voice and internet traffic to the SGW 220 (SC-SGW) at the SCONE 201, whereby the SC-SGW 220 may route the voice and internet traffic to the one or more SeNBs 240s for providing the voice and internet traffic to the subscribing user devices 300 via the one or more CSANs 540. Similarly, the PGW 110 may route the voice and internet traffic to the SGW 120 at the MNO core 101, whereby the SGW 120 may route the voice and internet traffic to the one or more MeNBs 140s for providing the voice and internet traffic to the subscribing user devices 300 via the macro-cell RAN 640. The MNO core 101 may also include an Offline Charging System (OFCS) and Online Charging System (OCS) module 154 and a Policy and Charging Rules Function (PCRF) for use by the PGW 110 at the MNO core 101.

In some implementations, the SCONE 201 provides mobility management using dual Enterprise Mobility Management (EMM) context on the user devices 300, standard E-UTRAN authentication, and mobility and session management procedures within the macro-cell RAN 640 and CSAN 540 domains. The interfacing between the MNO core 101 and the SCONE 201 may provide handover latency between the macro-cell RAN 640 and one of the CSANs 540 in less than one second assuming no changes to the MNO core 101 and less than 500 milliseconds by requiring only minor modifications to the PGW 110 at the MNO core 101. Unmodified user devices 300 may optionally be capable of accessing all services over the CSANs 540 by enabling idle-mode mobility between the CSANs 540 and the macro-cell RAN 5650 whereas connected mode handovers may be disruptive. In some examples, the user plane includes operator controlled Gi-Local Area Network (LAN) services to provide macro-cell RAN 640 parity on CSANs 540 and/or home-routing with a per-APN option for local breakout. The SCONE 201 may also be responsible for onboarding and federating across CSANs 540 and providing unified operating system dashboards and APIs to operators for user plane visibility. The user plane may also provide operator controls for managing macro offload eligibility at each CSAN 540 deployment with user level granularity.

Additionally or alternatively, the MNO core 101 may include an MNO Self Operating Network (SON)/Element Management System (EMS) module 132 configured to communicate with the OSS/BSS module 156 via a control plane and/or the MeNB 140 providing the macro-cell RAN 640. Mobility between the CSAN 540 and the macro-cell RAN 640 may occur using standard S1 handovers or optionally via an additional S10 integration interface between the MMEs 130, 230 at corresponding ones of the MNO core 101 and the SCONE 201. In some examples, the macro-cell RAN 640 and the CSAN 540 communicate with one another to facilitate handover conditions using nominal management plane signaling. For instance, the networks 540, 640 may communicate one or more of neighbor relations, handover threshold configurations, or idle mode cell-selection hints.

Figure 6B:
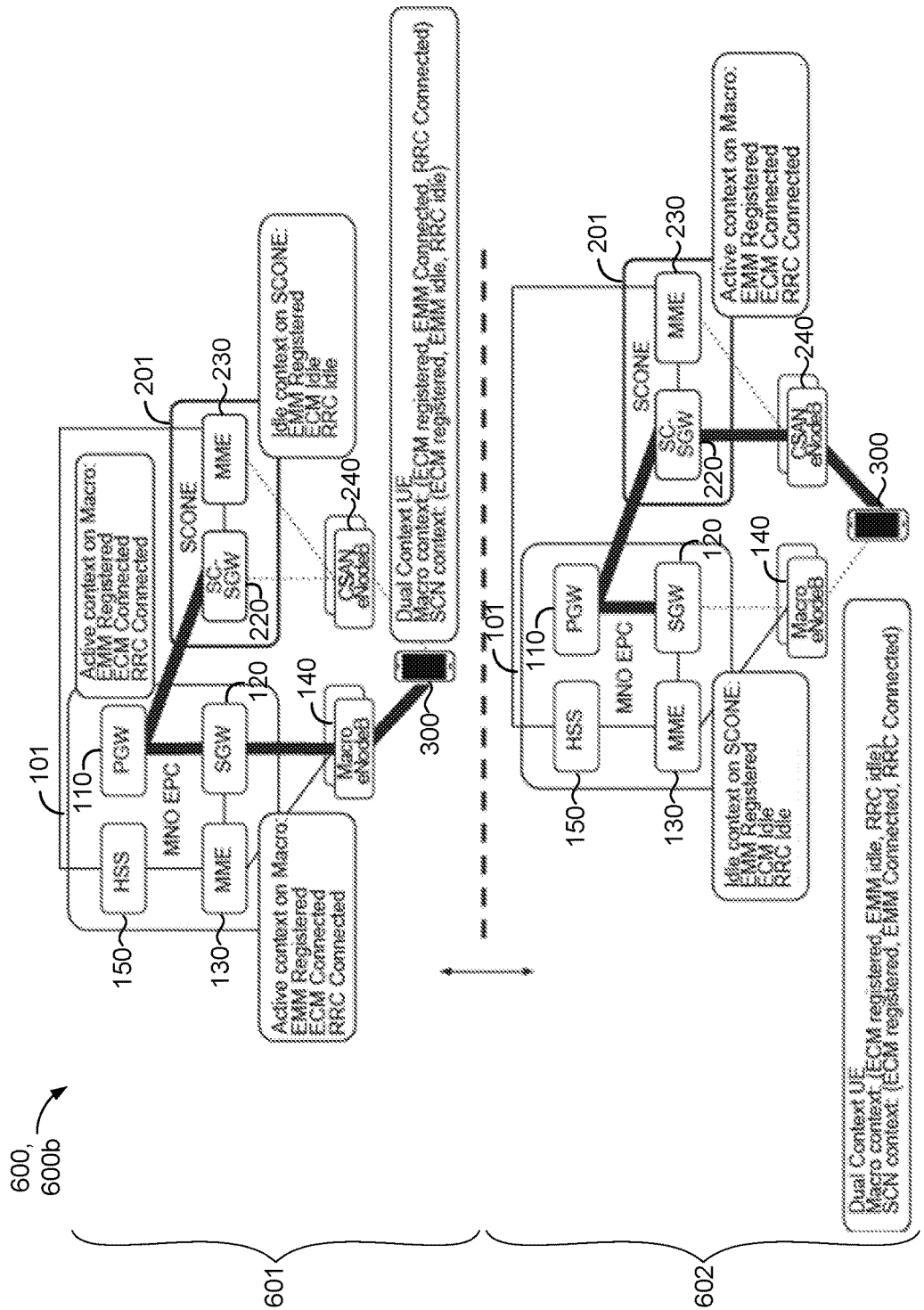
FIG. 6B is a schematic view of an example macro-cell network providing a packet data network gateway for directing the flow of data through a macro-cell network to a user device or a small-cell network to the user device.

Referring to FIG. 6B, a schematic view 600, 600b shows the MMEs 130, 230 at the MNO core 101 and the SCONE 201 maintaining independent registrations and contexts over the shared spectrum while a dual context user device 300 maintains EMM registration on the macro-cell RAN 640 and the CSAN 540 simultaneously via corresponding ones of the macro-cell eNB 140 or the SeNB 240. An upper portion 601 shows the user device 300 connected to the MeNB 140 to access services over the macro-cell RAN 640 while a lower portion 602 shows the user device 300 completing a handover to the SeNB 240 to access services over the one or more CSANs 540. In some examples, handovers execute responsive to a service request by the user device 300 on the target network 101 or 201 and idling on the source network 101 or 201. In some examples, the PGW 110 and HSS 150 at the MNO core 101 aree enhanced to complete handover latency in less than 500 milliseconds.

The PGW 110 at the MNO core 101 may route multiple bearers 12 to the two different SWG's 120, 220. At the upper portion 601, the MME 130 at the MNO core 101 is in an active context such that EMM is registered and both EPS Mobility Management and Connection Management (ECM) and RRC states are connected with the dual context user device 300. Conversely, the MME 230 at the SCONE 201 is in an idle context such that EMM is registered and ECM and RRC states are both idle. At the lower portion 602, when the user device 300 completes the handover to the small-cell eNB 240 for accessing services on the CSAN 540, the MME 130 at the MNO core 101 is in an idle context such that ECM and RRC states are now idle while the MME 230 at the SCONE 101 is in an active context to provide connected ECM and RRC states. FIG. 6D includes a schematic view 600, 600d showing a state chart for a dual EMM context user device 300 during connected-mode handovers.

Figure 6C:
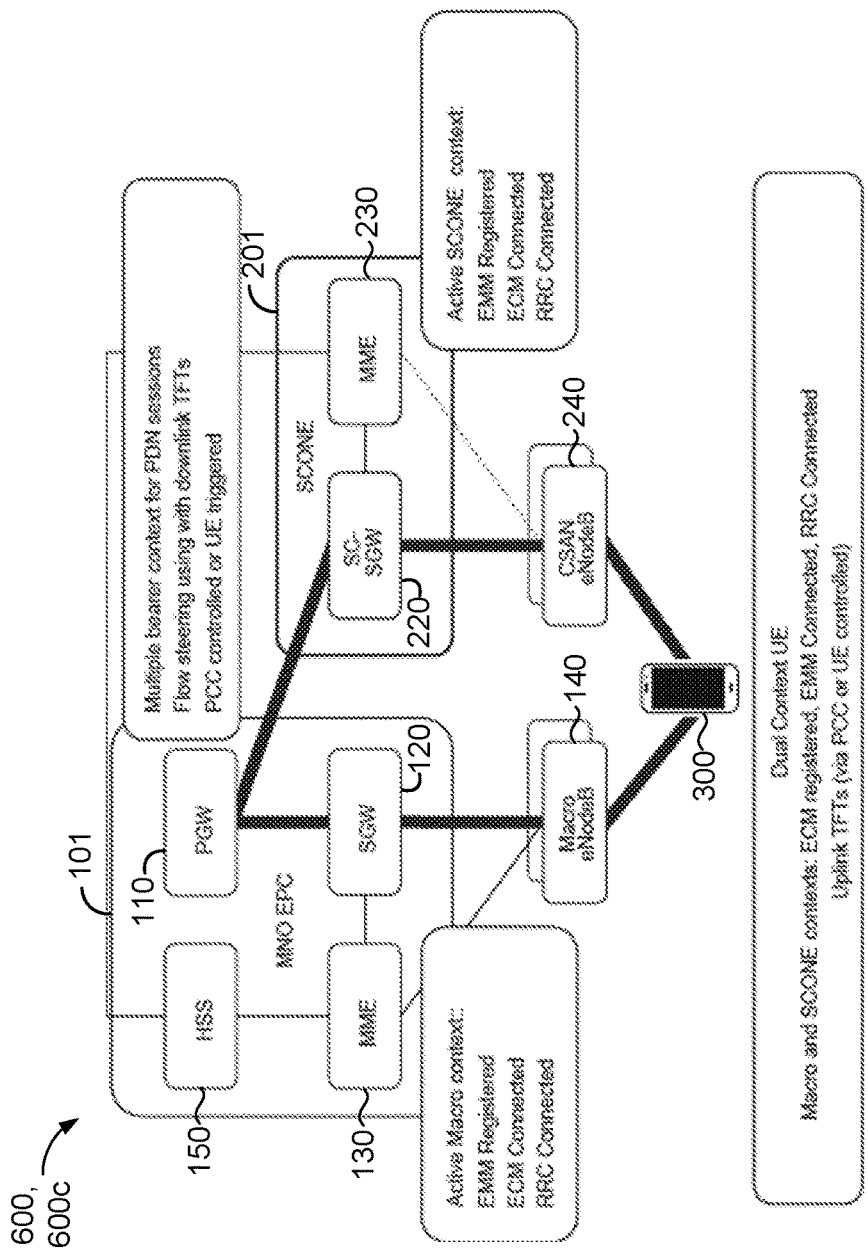
FIG. 6C is a schematic view of an example macro-cell network providing a packet data network gateway for directing the flow of data to a user device through both a macro-cell network and a small-cell network.
Figure 6D:
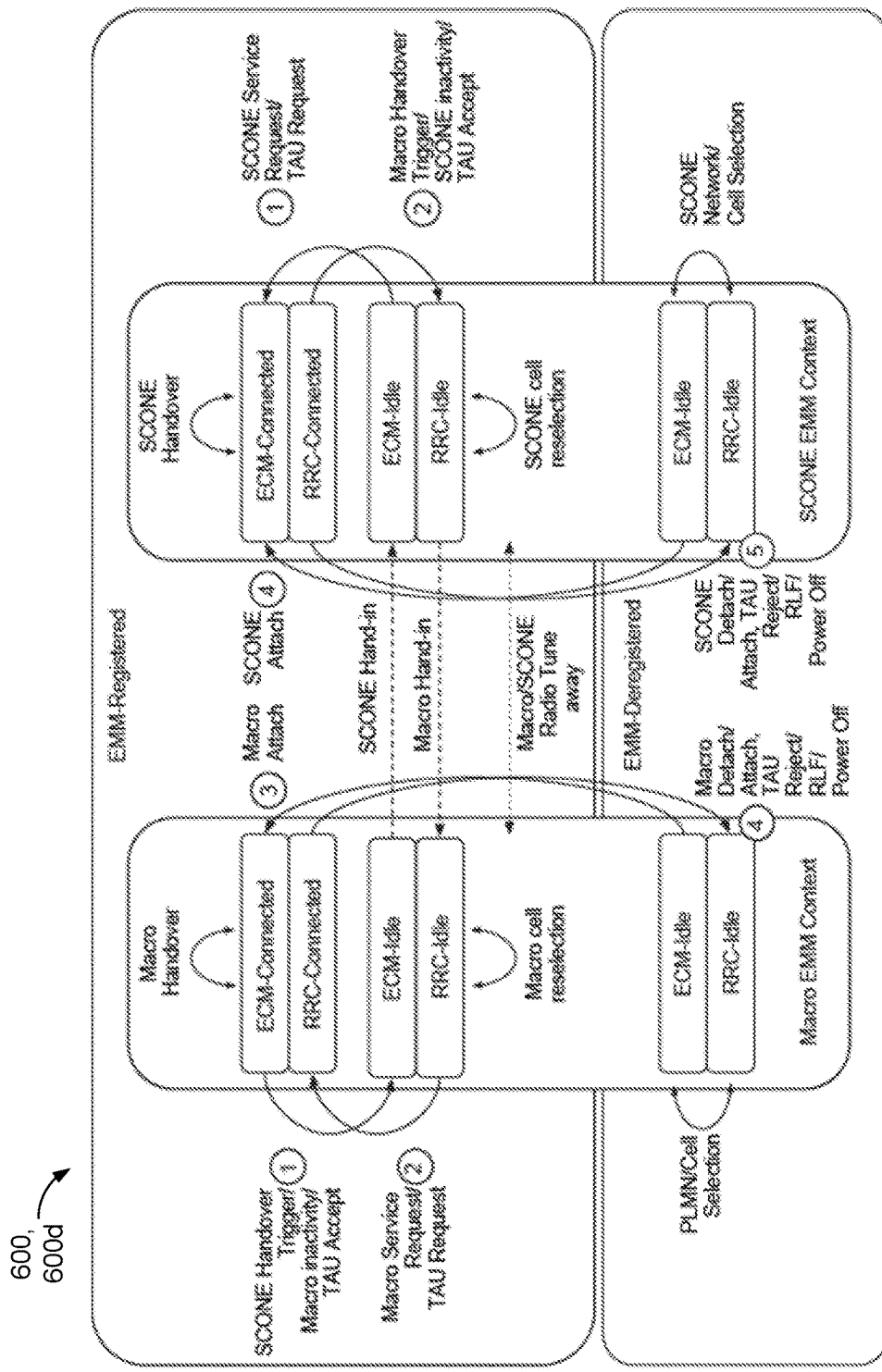
FIG. 6D is a schematic view showing a state chart for a dual Enterprise Mobility Management context user device 300 during connected-mode handovers.

In some implementations, referring to FIG. 6C, a schematic view 600, 600c shows the dual context user device 300 simultaneously connected to both the macro-cell RAN 640 and the CSAN 540 to provide an active context and registered EMM for both the MMES 130, 230. For instance, the ECM and RRC states are connected at both the MMES 130, 230 to enable make-before-break (e.g., zero packet loss) handovers. The dual connection to the networks 540, 640 by the user device 300 requires multi-radio support on the user device in addition to the dual EMM registration. In some examples, the PGW 110 at the MNO core 110 provides multiple bearer context for PDN sessions by using downlink traffic flow templates. For instance, flow steering may occur on the PGW 110 for downlink transmissions and on the user device 300 for uplink transmissions. In some examples, mobility between the macro-cell RAN 630 and the CSANs 540 enacts as flow steering updates to the target network.

Figure 7A:
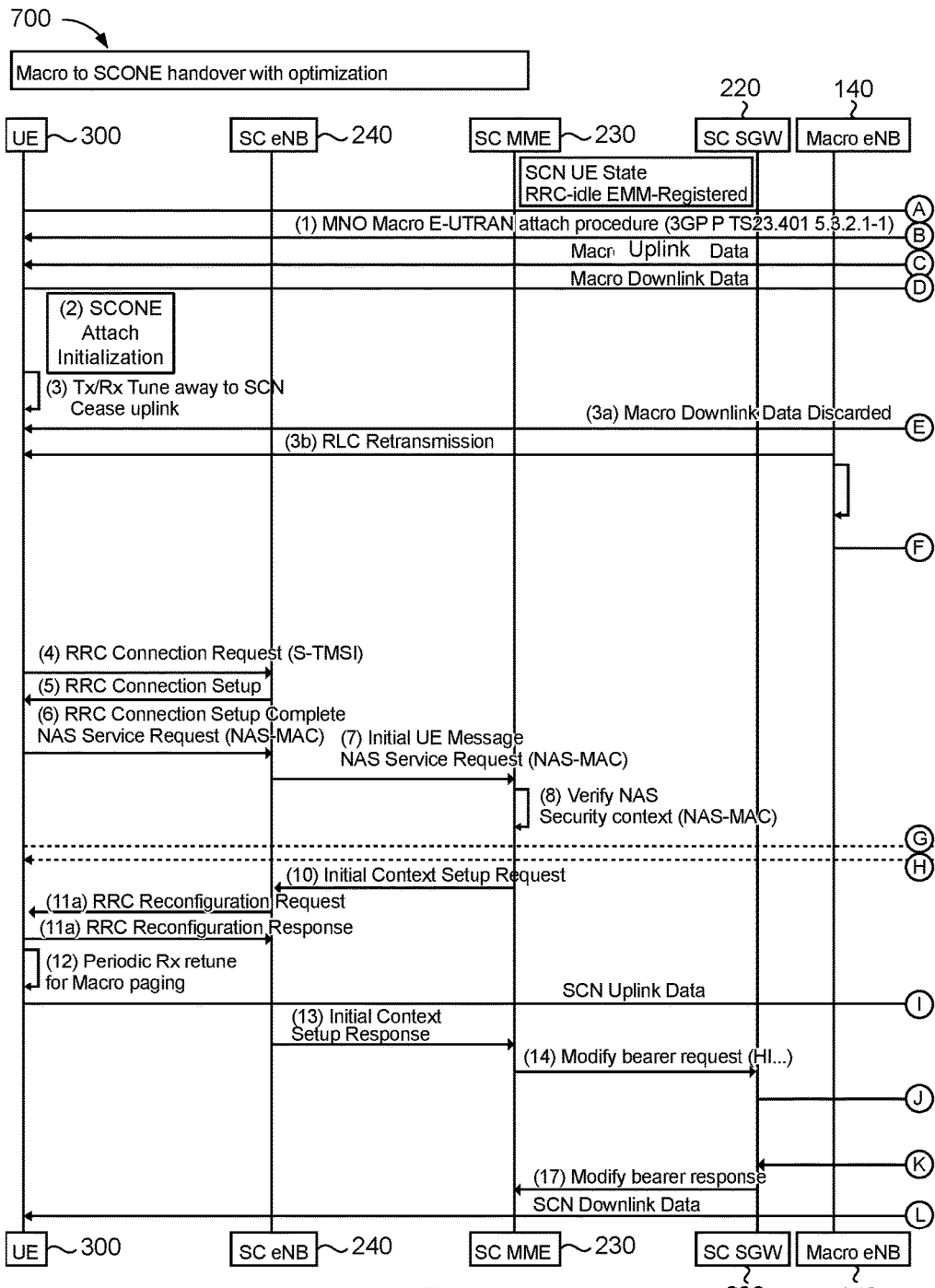
FIGS. 7A and 7B are a split-diagram illustrating example operations performed by a packet data network gateway of a macro-cell network during a macro-cell network to small-cell network handover with optimization.
Figure 7B:
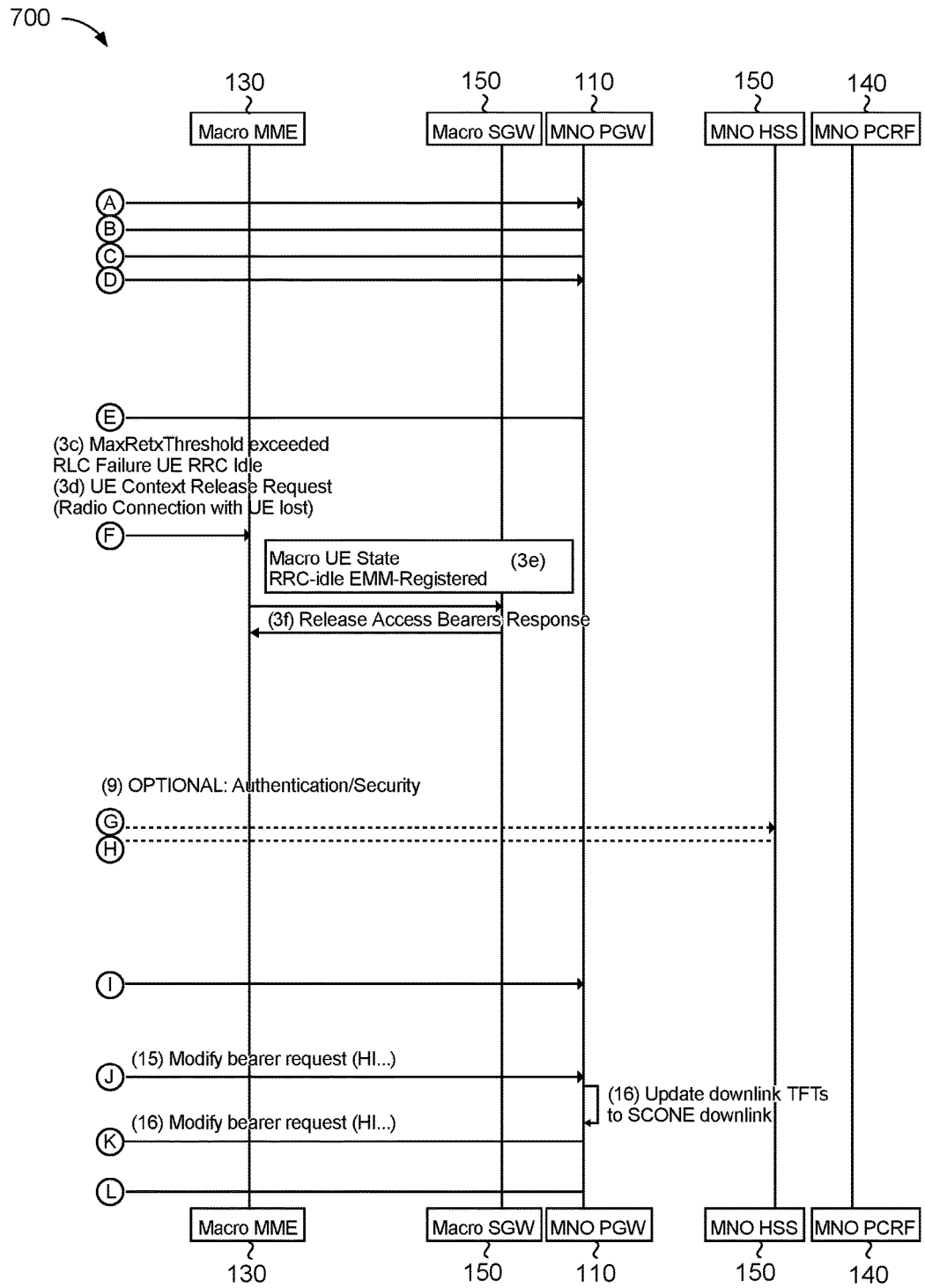

FIGS. 7A and 7B are a split-diagram 700 illustrating example operations performed by the PGW 110 of the MNO core 101 during a MNO core 101 to SCONE 201 handover with optimization by using a context switched PDN session. The diagram 700 may be described with reference 6A-6D during a handover of the user device 300 from the macro-cell RAN 640 to the one or more CSANs 540. The operations of the diagram 700 are split between FIGS. 7A and 7B. The vertical y-axis indicates time increasing from the top to the bottom. In response to receiving a signal from the user device (UE) 300 indicating that the UE 300 is EMM-registered and the RRC state with the SCONE 201 is idle, the PGW 110 at the MNO core 101 provides an MNO Macro E-UTRAN attach procedure at time (1) followed by downlink data of the MNO core 101 to the UE 300. The UE 300 provides uplink data of to the PGW 110 to trigger a small-cell network attach initialization at time (2), and subsequently tunes transmitter(s) Tx and/or receivers (Rx) away to the small-small network 201 to cease the uplink at time (3). At time (3a), the PGW 110 signals the UE 300 to discard the macro-cell downlink data, and thereafter, the MeNB 140 provides an RLC retransmission to the UE 300 at time (3b).

At time (3c), the MeNB 140 signals the MME 130 at the MNO core 101 to inform the MNO core 101 that a maximum retransmission threshold is exceeded, and thereafter, requests the MME 130 to release the active context with the UE 300 at time (3d). In response to receiving an indication from the MME 130 that the MME 130 at the MNO core 101 is in an idle context such that ECM and RRC states are now idle at time (3e), the SGW 120 at the MNO core 101 releases access bearers over the MNO core 101 at time (3f).

At time (4), the UE 300 transmits an RRC connection request to the SeNB 240 at the SCONE 201 for accessing services over the one or more CSANS 540, and at time (5), receives an RRC connection setup from the SeNB 240, to enable the UE 300 to complete RRC connection with the SeNB 240 at time (6). At time (7), the SeNB 240 at the SCONE 201 transmits an initial UE message to the MME 230 at the SCONE 201 requesting non-access stratum (NAS), and at time (8), the MME 230 verifies the NAS security context of the NAS Media Access Control (MAC) layer of the UE 300. In some examples, at times (9) and (10), the UE 300 and the HSS 150 at the MNO core 101 optionally communicate authentication/security information to one another.

The MME 230 at the SCONE 201 provides an initial context setup request to the MeNB 240 at time (10). Thereafter, the MeNB 240 transmits an RRC reconfiguration request to the UE 300 at time (11a) and receives an RRC reconfiguration response from the UE 300 at time (11b). The UE 300 may periodically retune the Rx to receive pages from the MNO core 101 and may provide uplink data for the SCONE 201 to the PGW 110 at the MNO core 101. The MeNB 240 provides an initial context setup request to the MME 230 at time (13), and thereafter, the MME 230 modifies a bearer request with the SGW 220 at the SCONE 201 at time (14) to cause the SGW 220 to modify the bearer request with the PGW 110 at the MNO core 101 at time (15). In response to receiving the modified bearer request from the SGW 220 at the SCONE 201, the PGW 110 updates downlink TFTs for SCONE downlink transmissions and provides a modified bearer response to the SGW 220 at time (16). At time (17), the SGW 220 provides the modified bearer response to the MME 230 to enable the PGW 110 to provide downlink data for the SCONE 201 to the UE 300.

Figure 8A:
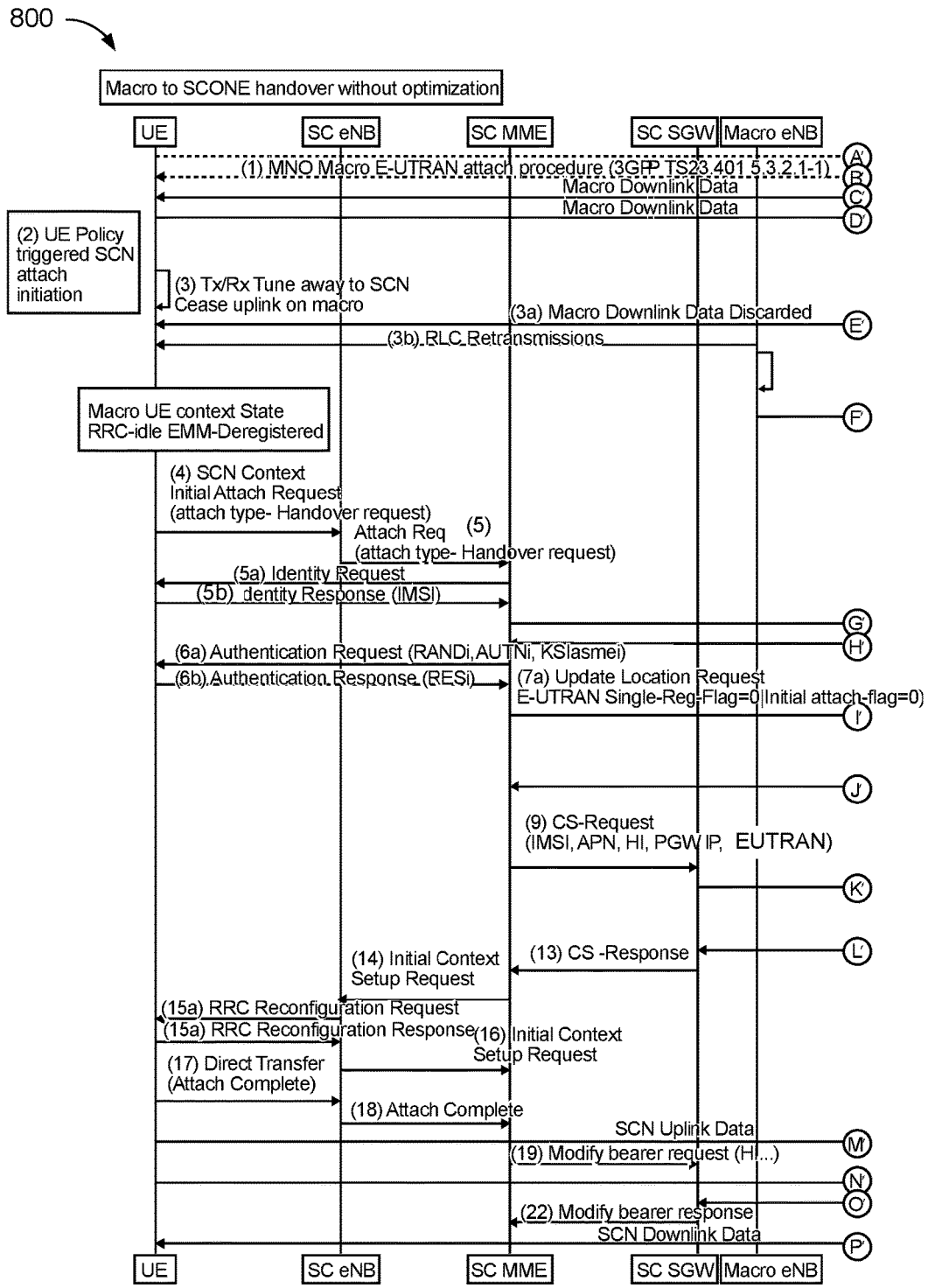
FIGS. 8A and 8B are a split-diagram illustrating example operations performed by a packet data network gateway of a macro-cell network during a macro-cell network to small-cell network handover without optimization.
Figure 8B:
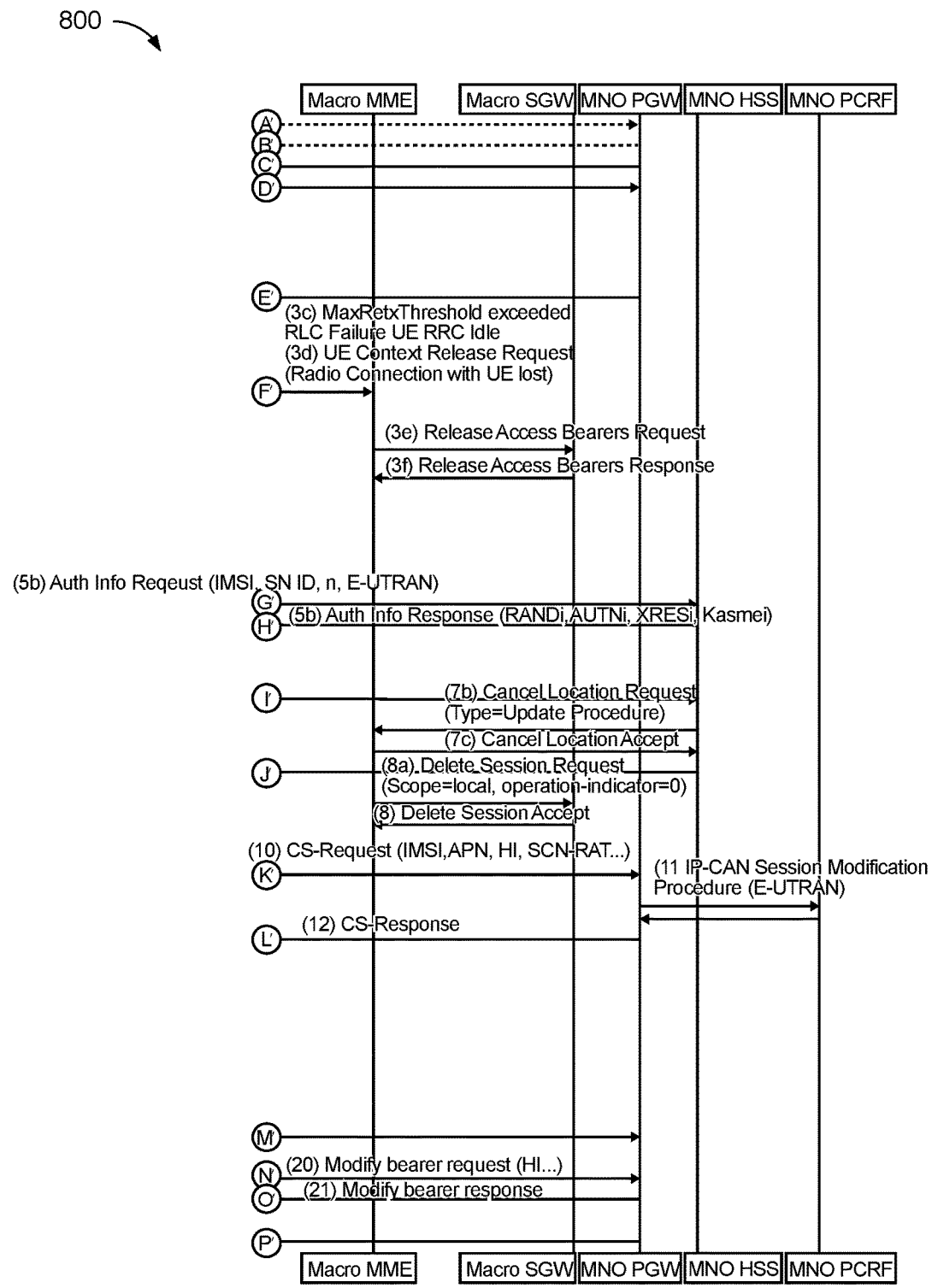

FIGS. 8A and 8B are a split-diagram 800 illustrating example operations performed by the PGW 110 of the MNO core 101 during a MNO core 101 to SCONE 201 handover without optimization using context relocation. The diagram 800 may be described with reference 6A-6D during a handover of the user device 300 from the macro-cell RAN 640 to the one or more CSANs 540. The operations of the diagram 800 are split between FIGS. 8A and 8B. The vertical y-axis indicates time increasing from the top to the bottom. The PGW 110 at the MNO core 101 provides an MNO Macro E-UTRAN attach procedure at time (1) followed by downlink data of the MNO core 101 to the UE 300. The UE 300 provides uplink data of to the PGW 110 to trigger a small-cell network attach initialization at time (2), and subsequently tunes transmitter(s) Tx and/or receivers (Rx) away to the small-small network to cease the uplink at time (3). At time (3a), the PGW 110 signals the UE 300 to discard the macro-cell downlink data, and thereafter, the MeNB 140 provides an RLC retransmission to the UE 300 at time (3b).

At time (4), the UE 300 transmits an initial attach request (e.g., handover request) to the MeNB 240, and at time (5), the MeNB 240 at the SCONE 201 transmits the initial attach request to the MME 230 at the SCONE 201. At time (5A), the MME 230 requests identify of the UE 300 and receives an identify response from the UE 300 at time (5b). Thereafter, the MME 230 requests authorization information from the HSS 150 at the MNO core 101, and the HSS 150 provides an authorization information response back to the MME 230 in response to the request. The MME 230 then provides an authentication request to the UE 300 at time (6a) and receives an authentication response from the UE 300 at time (6b). At time (7a), the MME 230 at the SCONE 201 requests an update location from the HSS 150. At time (7b), the HSS 150 requests to cancel location with the MME 130 at the MNO core 101, while the MME 130 accepts the canceled location with the HSS 150 at time (7c). At time (7d), the HSS 150 provides an updated location response to the MME 230 at the SCONE 201.

At time (8a), the HSS 150 requests a delete session with the MME 130, and at time (8b), the MME 130 accepts the delete session with the HSS 150. At time (9), the MME 230 at the SCONE 201 provides a CS request to the SGW 220, and at time (10), the SGW 220 relays the CS request to the PGW 110 at the MNO core 101. Thereafter, the PGW 110 executes an IP-CAN session modification procedure (E-UTEAN) with the PCRF 152 at time (11), and at time (12), the PGW 110 provides a CS response back to the SGW 220 at the SCONE 201. The SGW 220 may relay the CS response to the MME 230 at time (13), and at time (14), the MME 230 requests an initial context setup with the eNB 240 at the SCONE 201. Thereafter, the MeNB 240 transmits an RRC reconfiguration request to the UE 300 at time (15a) and receives an RRC reconfiguration response from the UE 300 at time (15b). The eNB 240 may provide an initial context setup response to the MME 230.

The UE 300 transmits a direct transfer to the eNB 240 at time (17), and the MeNB 240 relays the direct transfer to the MME 230 indicating the attach to the SCONE 201 by the UE 300 is complete at time (18). Accordingly, the UE 300 may now provide uplink data for the SCONE 201 to the PGW 110 at the MNO core 101. At time (19), the MME 230 modifies a bearer request with the SGW 220 to cause the SGW 220 to modify the bearer request with the PGW 110 at the MNO core 101 at time (20). In response to receiving the modified bearer request from the SGW 220 at the SCONE 201, the PGW 110 provides a modified bearer response to the SGW 220 at time (21). At time (22), the SGW 220 provides the modified bearer response to the MME 230 to enable the PGW 110 to provide downlink data for the SCONE 201 to the UE 300.

Figure 9:
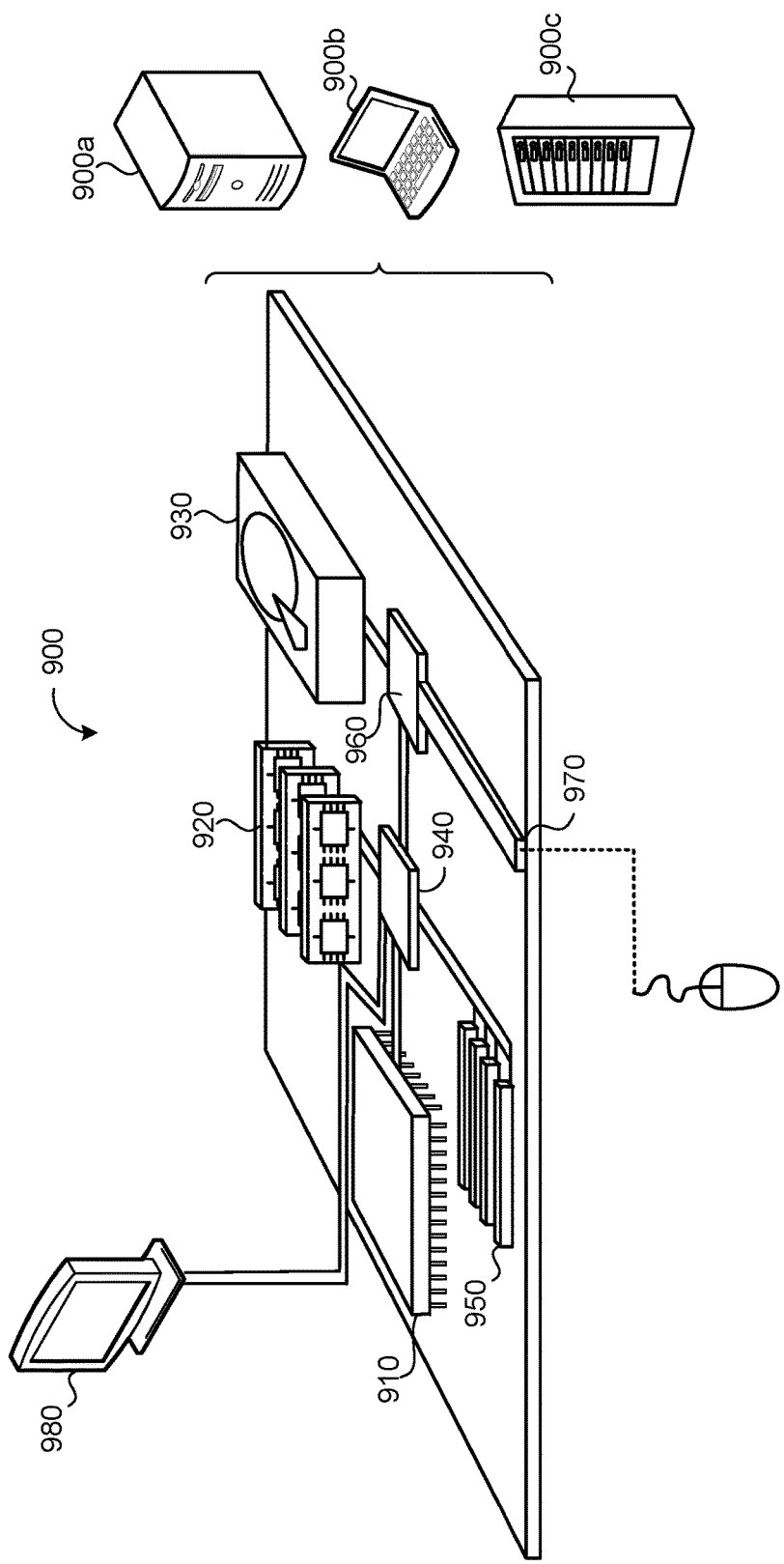
FIG. 9 is a schematic view of an example computing device.

FIG. 9 is schematic view of an example computing device 900 (e.g., control hardware) that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

In some implementations, the control hardware 900 of the PGW 110, 220 at the corresponding one of the macro-cell network 101 or the small-cell network 201 simultaneously balances network traffic load across both of the macro-cell network 101 and the small-cell network 201. For example, the PGW 110, 220 implementing the control hardware 900 may receive one or more data packets 40 from an external network 30, determine a quality of the macro-cell network 101 and the small-cell network 201, and route the one or more data packets 40 through at least one of the macro-cell network 101 or the small-cell network 201 to a user device 300 configured for dual connectivity with the both of the networks 101, 201. The control hardware 900 may receive link-layer statistics 304 from the user device 300 that indicate the quality of the macro-cell network 101 and the small-cell network 201 during downlink communications. In some examples, the control hardware 900 routes the one or more data packets 40 by executing a flow aware aggregation procedure that simultaneously distributes a first flow of data 241 through the small-cell network 201 and a separate second flow of data 242 through the macro-cell network 101. In other examples, when the control hardware 900 is associated with the PGW 110 at the small-cell network 201, the control hardware 900 routes the one or more data packets 40 by executing a flow agnostic aggregation procedure that simultaneously splits at least one of a first flow of data 241 or a second flow of data 242 between both the small-cell network 201 and the macro-cell network 101.

Figure 10:
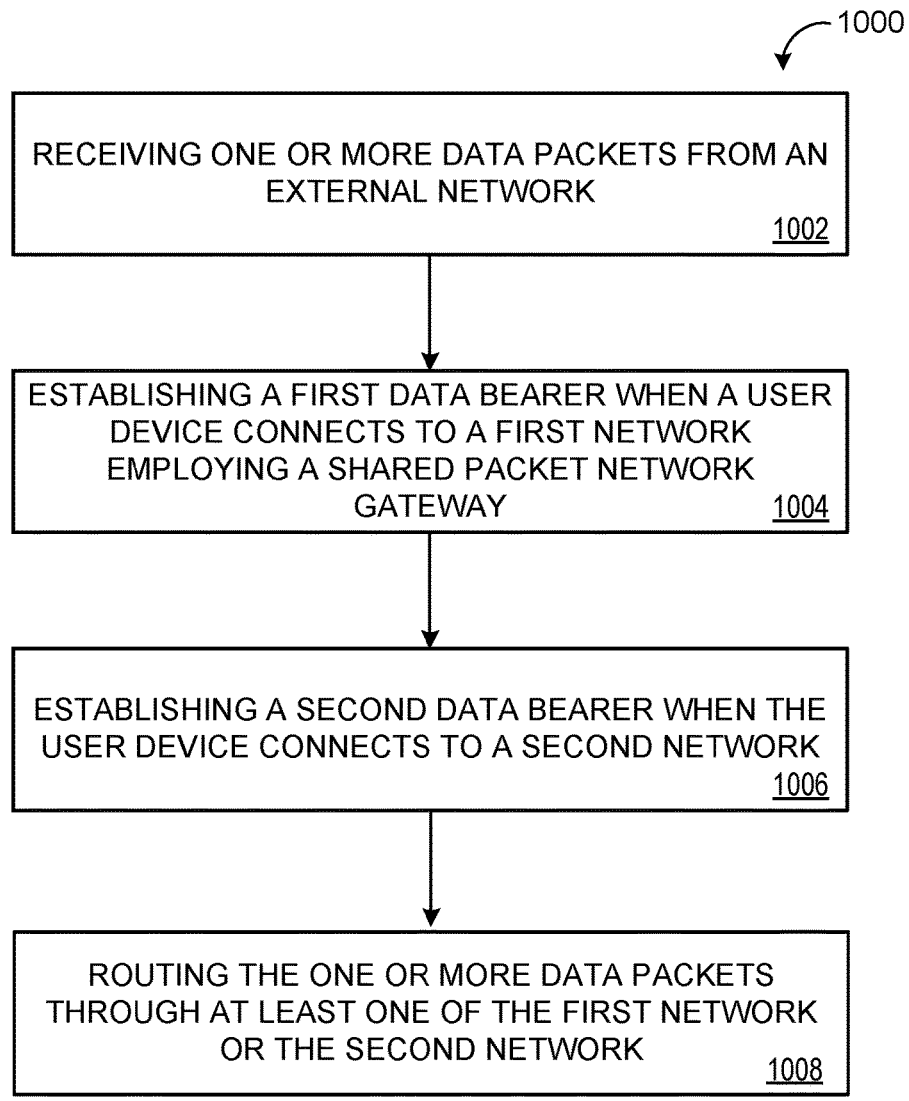
FIG. 10 is a flowchart of an example method 1000 for routing one or more data packets to a user device through at least one of a first network or a second network.

FIG. 10 is a flowchart of an example method 1000 executed by the computing device 900 (e.g., control hardware) of FIG. 5 implemented at the shared PGW 110, 210 for routing one or more data packets 40 to a user device 300. The flowchart starts at operation 1002 where a shared PGW 110, 210 receives one or more data packets 40 from an external network 30 in communication with the shared PGW 110, 210. At operation 1004, the control hardware 900 at the shared PGW 110, 210 establishes a first data bearer 12a when the user device 300 connects to a first network 101 employing the control hardware 900. At operation 1006, the control hardware 900 establishes a second data bearer 12b when the user device 300 connects to a second network 201. The user device is configured for dual connectivity with the first network 101 and the second network 201. At operation 1008, the control hardware 900 at the shared PGW 110, 210 routes the one or more data packets 40 through at least one of the first network 101 or the second network 201 to simultaneously balance network traffic load across both the first network and the second network. In some examples, the first network includes a small-cell network and the second network 201 includes a macro-cell network. In other examples, the first 101 network includes the macro-cell network and the second network 201 includes the small-cell network.

The user device 300 is configured for dual connectivity with the macro-cell network 101 or the small-cell network 201. In some implementations, the shared PGW 110, 210 routes the data packets 40 by executing a flow aware aggregation procedure that simultaneously distributes a first flow of data 241 along a respective bearer 12b through the macro-cell network 101 and a separate second flow of data 242 along a respective bearer 12a through the small-cell network 201. In these implementations, the small-cell network 201 may employ the shared PGW 210 to facilitate the flow aware aggregation procedure or the macro-cell network 101 may employ the shared PGW 110 to facilitate the flow aware aggregation procedure. In some examples, the first flow of data 241 and the second flow of data 242 are equally balanced between the networks 101, 201 when the first flow of data 241 and the second flow of data 242 are carrying a substantially equal amount of data.

In some implementations, when the small-cell network 201 employs the shared PGW 210, the PGW 210 routes the one or more data packets 40 by executing a flow agnostic aggregation procedure (FIG. 2C) that simultaneously splits at least one flow of data 40 between both the small-cell network 201 and the macro-cell network 101. In other implementations, when the macro-cell network 101 employs the shared PGW 110, the PGW 110 routes the one or more data packets 40 by routing multiple bearers 12 (FIG. 4C) having a same access point name across both the small-cell network 201 and the macro-cell network 101. For instance, the PGW 110 may split a first bearer 12a associated with IMS data and a second bearer 12b associated with Internet data through both the macro-cell network 101 via the SGW 120 and the small-cell network 201 via the SGW 220 and the TWAN 215. Here, the TWAN 215 associated with the SGW 220 at the small-cell network 201 enables the small-cell network 201 to be treated as a Trusted non 3GPP access for the shared spectrum of different RAT than that of the macro-cell network 101, thereby allowing the PGW 110 at the macro-cell network 101 to route the multiple bearers 12 for the same access point name across both the macro-cell network 101 and the small-cell network 201. Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at control hardware of a packet data network gateway employed by a first network, one or more data packets from an external network in communication with the control hardware;
establishing, by the control hardware, a first data bearer when a user device connects to the first network employing a first serving gateway in communication with the control hardware, the control hardware routing the first data bearer to the first serving gateway;
establishing, by the control hardware, a second data bearer when the user device connects to a second network employing a second serving gateway in communication with the control hardware, the control hardware routing the second data bearer to the second serving gateway and the user device configured for dual connectivity with the first network via a first communication node that maps to the first serving gateway, and the second network via a second communication node that maps to the second serving gateway; and
routing the one or more data packets through at least one of the first network along the first data bearer or the second network along the second data bearer to the user device to simultaneously balance network traffic load across both the first network and the second network.

2. The method of claim 1, wherein the first network comprises one of a small-cell network or a macro-cell network and the second network comprises the other one of the small-cell network or the macro-cell network.

3. The method of claim 2, wherein:
the macro-cell network comprises a first long-term evolution radio access network supporting radio communication of the one or more data packets from the external network to the user device via one or more macro-cell evolved nodes; and
the small-cell network comprises a second long-term evolution radio access network supporting radio communication of the one or more data packets from the external network to the user device via one or more small-cell evolved nodes.

4. The method of claim 2, wherein the macro-cell network and the small-cell network are associated with different carriers and the user device is a subscriber of both the macro-cell network and the small-cell network.

5. The method of claim 2, wherein the macro-cell network is associated with a mobile network operator and the small-cell network comprises a neutral host network for the macro-cell network, and wherein the user device is a subscriber of the macro-cell network.

6. The method of claim 1, further comprising:
receiving, at the control hardware, link-layer statistics from the user device, the link-layer statistics indicating a quality of the first network and the second network during downlink communications,
wherein the routing of the one or more data packets through at least one of the first network or the second network is based on the quality of the first network and the second network during the downlink communications.

7. The method of claim 6, wherein the user device comprises:
a first interface providing first control plane layers configured to interface with the first network;
a second interface providing second control plane layers configured to interface with the second network; and
an application layer configured to collect and provide the link-layer statistics to the control hardware.

8. The method of claim 1, wherein the routing of the one or more data packets comprises executing a flow aware aggregation procedure that simultaneously distributes a first flow of data to the user device through the first network and a separate second flow of data to the user device through the second network.

9. The method of claim 1, wherein the first flow of data and the second flow of data are equally balanced between the first network and the second network when the first flow of data and the second flow of data are carrying a substantially equal amount of data.

10. The method of claim 1, further comprising:
when the first network comprises a small-cell network and the second network comprises a macro-cell network, executing, by the control hardware, a flow agnostic aggregation procedure that simultaneously splits at least one flow of data for routing to the user device between the first network and the second network.

11. The method of claim 1, further comprising:
when the first network comprises a macro-cell network and the second network comprises a small-cell network:
determining, by the control hardware, the first data bearer and the second data bearer each comprise a same access point name, and
wherein routing the one or more data packets comprises routing the first data bearer and the second data bearer to the user device through both the first network and the second network.

12. The method of claim 11, wherein the second network includes a serving gateway associated with a terrestrial wide area network configured to associate the second network as a trusted non-3$^{rd}$ Generation Partnership Project access for a shared spectrum having a different radio access technology than a radio access technology of the first network.

13. The method of claim 11, wherein the first bearer is associated with Internet data and the second bearer is associated with Internet Protocol Multimedia Subsystem data.

14. The method of claim 1, further comprising:
receiving, at the control hardware, an uplink data packet from the user device through one of the first network or the second network; and
transmitting the received uplink data packet to the external network.

15. The method of claim 1, wherein the user device receives modem measurement reports from each of the first network and the second network and uses the modem measurement reports to steer uplink traffic by routing the uplink data packet through the one of the first network or the second network, each modem measurement report indicating traffic and/or available bandwidth over the respective one of the first network or the second network.

16. A system configured for wireless communication, the system comprising:
a first network in communication with an external network and including a packet network gateway, a first serving gateway, and a first communication node that maps to the first serving gateway;
a second network in communication with the external network and including a second serving gateway and a second communication node that maps to the second serving gateway; and
a user device configured for dual connectivity to the first network and the second network, the user device communicating with the external network through at least one of the first network or the second network,
wherein the packet data network gateway of the first network is shared by both the first network and the second network, the packet data network comprising control hardware configured to:
receive one or more data packets from the external network;
establish a first data bearer when the user device connects to the first network, the control hardware routing the first data bearer to the first serving gateway;
establish a second data bearer when the user device connects to the second network, the control hardware routing the second data bearer to the second serving gateway; and
route the one or more data packets through at least one of the first network along the first data bearer or the second network along the second data bearer to the user device to simultaneously balance network traffic load across both the first network and the second network.

17. The system of claim 16, wherein the first network comprises one of a small-cell network or a macro-cell network and the second network comprises the other one of the small-cell network or the macro-cell network.

18. The system of claim 17, wherein:
the macro-cell network comprises a first long-term evolution radio access network supporting radio communication of the one or more data packets from the external network to the user device via one or more macro-cell evolved nodes; and
the small-cell network comprises a second long-term evolution radio access network supporting radio communication of the one or more data packets from the external network to the user device via one or more small-cell evolved nodes.

19. The system of claim 17, wherein the macro-cell network and the small-cell network are associated with different carriers and the user device is a subscriber of both the macro-cell network and the small-cell network.

20. The system of claim 17, wherein the macro-cell network is associated with a mobile network operator and the small-cell network comprises a neutral host network for the macro-cell network, and wherein the user device is a subscriber of the macro-cell network.

21. The system of claim 16, wherein the control hardware is further configured to:
receive link-layer statistics from the user device, the link-layer statistics indicating a quality of the first network and the second network during downlink communications,
wherein the control hardware routes the one or more data packets through at least one of the first network or the second network based on the quality of the first network and the second network during the downlink communications.

22. The system of claim 21, wherein the user device comprises:
a first interface providing first control plane layers configured to interface with the first network;
a second interface providing second control plane layers configured to interface with the second network; and
an application layer configured to collect and provide the link-layer statistics to the control hardware.

23. The system of claim 16, wherein the control hardware is further configured to route the one or more data packets by executing a flow aware aggregation procedure that simultaneously distributes a first flow of data to the user device through the first network and a separate second flow of data to the user device through the second network.

24. The system of claim 16, wherein the first flow of data and the second flow of data are equally balanced between the first network and the second network when the first flow of data and the second flow of data are carrying a substantially equal amount of data.

25. The system of claim 16, wherein:
the first network comprises a small-cell network and the second network comprises a macro-cell network; and the control hardware is further configured to route the one or more data packets by executing a flow agnostic aggregation procedure that simultaneously splits at least one flow of data for routing to the user device between the first network and the second network.

26. The system of claim 16, wherein:
the first network comprises a macro-cell network and the second network comprises a small-cell network; and
the control hardware is further configured to:
    determine the first data bearer and the second data bearer each comprise a same access point name, and
    route the first data bearer and the second data bearer to the user device through both the first network and the second network.

27. The system of claim 26, wherein the second serving gateway of the second network is associated with a terrestrial wide area network configured to associate the second network as a trusted non-3$^{rd}$ Generation Partnership Project access for a shared spectrum having a different radio access technology than a radio access technology of the first network.

28. The system of claim 26, wherein the first bearer is associated with Internet data and the second bearer is associated with Internet Protocol Multimedia Subsystem data.

29. The system of claim 16, wherein the control hardware is further configured to:
    receive an uplink data packet from the user device through one of the first network or the second network; and
    transmit the received uplink data packet to the external network.

30. The system of claim 16, wherein the user device is configured to:
    receive a first modem measurement report from the first communication node of the first network, the first modem measurement report indicating traffic and/or available bandwidth over the first network;
    receive a second modem measurement report from the second communication node of the second network, the second modem measurement report indicating traffic and/or available bandwidth over the second network; and
    steer uplink traffic by routing the uplink data packet through the one of the first network or the second network based on the received first and second modem measurement reports.

* * * * *